United States Patent [19]
Fleet et al.

[11] Patent Number: 5,949,055
[45] Date of Patent: Sep. 7, 1999

[54] AUTOMATIC GEOMETRIC IMAGE TRANSFORMATIONS USING EMBEDDED SIGNALS

[75] Inventors: David J. Fleet, Kingston, Canada; David J. Heeger, Palo Alto, Calif.; Todd A. Cass, San Francisco, Calif.; David L. Hecht, Palo Alto, Calif.

[73] Assignee: Xerox Corporation, Stamford, Conn.

[21] Appl. No.: 08/956,839

[22] Filed: Oct. 23, 1997

[51] Int. Cl.$^6$ ............................................. G06K 7/12
[52] U.S. Cl. ................. 235/469; 235/454; 235/462.41; 235/494; 382/165
[58] Field of Search ............................ 235/469, 462.01, 235/462.04, 462.07, 462.1, 462.125, 462.127, 462.41, 454, 470, 487, 494; 382/164, 165, 309

[56] References Cited

U.S. PATENT DOCUMENTS

| | | | |
|---|---|---|---|
| 4,120,045 | 10/1978 | Moellgaard et al. | 235/470 X |
| 4,964,066 | 10/1990 | Yamane et al. | 235/454 X |
| 5,091,966 | 2/1992 | Bloomberg et al. | 382/21 |
| 5,199,081 | 3/1993 | Saito et al. | 235/380 X |
| 5,278,400 | 1/1994 | Appel | 235/494 |
| 5,315,098 | 5/1994 | Tow | 235/494 |
| 5,416,308 | 5/1995 | Hood et al. | 235/454 |
| 5,629,990 | 5/1997 | Tsuji et al. | 235/454 X |
| 5,646,388 | 7/1997 | D'Entremont et al. | 235/380 |

FOREIGN PATENT DOCUMENTS

WO 95/14289  5/1995  WIPO.

OTHER PUBLICATIONS

Brassil et al., "Electronic Marking and Identification Techniques to Discourage Document Copying" in *IEEE Journal on Selected Areas in Communications*, vol. 12, No. 8, Oct. 1995, pp. 1495–1504.

Cox, Kilian, Leighton and Shamoon, "Secure Spread Spectrum Watermarking for Multimedia," *NEC Research Institute Technical Report* No. 95–10, 1995. month missing.

A. Poirson and B. Wandell, "The appearance of colored patterns: pattern–color separability", *Journal of the Optical Society of America A*, 10:2458–2471, 1993. month missing.

A. Poirson and B. Wandell, "Pattern–color separable pathways predict sensitivity to single colored patterns", *Vision Research*, 36:515–526, 1996. month missing.

X. Zhang and B. Wandell, "A spatial extension of CIELAB for digital color image reproduction", *Proceedings of the Society of Information Display 96 Digest*, pp. 731–734, San Diego, 1996. month missing.

*Primary Examiner*—Michael G. Lee

[57] ABSTRACT

An acquired (e.g., scanned) image contains an imperceptible periodic signal component (e.g., a sinusoid), decoding of which can be used to automatically determine a linear geometric relationship between the acquired image and the original image in which the signal was embedded, without having the original image available during the decoding process. This known geometric relationship allows for linear geometric properties of the acquired image, such as alignment and scaling, to be automatically matched with those of the original image so that the acquired image may be automatically oriented and scaled to the size of the original image. The embedded periodic signals produce a distinct pattern of local peak power concentrations in a spatial frequency amplitude spectrum of the acquired image. Using geometric constraint information about the embedded signals when the signals were originally embedded in the image, the locations and spatial frequencies of the signals are decoded from the image, providing a linear mapping between the peak power concentrations of the acquired and original image spatial frequency amplitude spectra. This linear mapping can be used to compute the linear geometric relationship between the two images. In an illustrated embodiment, the acquired image contains a set of sinusoidal signals that act as a grid. Decoding of the sinusoids does not require the original image, only information about the predetermined geometric relationship of the embedded sinusoids.

18 Claims, 11 Drawing Sheets

I(x,y)

$S^i(x,y)$ $I(x,y) + S^i(x,y)$

AUTOMATIC GEOMETRIC IMAGE TRANSFORMATIONS USING EMBEDDED SIGNALS

CROSS REFERENCE TO RELATED APPLICATIONS

The present invention is related to the subject matter of a concurrently-filed, copending patent application assigned to the same assignee as the present application, having an application Ser. No. 08/956,638 and entitled "Method For Embedding Signals In A Color Image."

BACKGROUND OF THE INVENTION

The present invention relates generally to a processor-based technique in the field of information decoding, and, more particularly, to a process for decoding signals embedded in an acquired image version of an original image. Information about geometric properties of the original image can be determined from the embedded signals in the acquired image thus allowing geometric transformations of the acquired image in order to match geometric properties of the original image, without use of the original image in the decoding or transformation processes.

Encoding information in image form to permit its subsequent electronic decoding is a well-known information processing technique. For example, bar codes explicitly carry encoded information in black and white image form, and are typically used in applications where the obvious and perceptible presence of the encoded information is intended and is not a disadvantage.

Data glyph technology is a category of embedded encoded information that is particularly advantageous for use in image applications that require the embedded data to be robust for decoding purposes yet inconspicuous, or even surreptitious, in the resulting image. Data glyph technology encodes digital information in the form of binary 1's and 0's which are then rendered in the form of distinguishable shaped marks such as very small linear marks. Generally, each small mark represents a digit of binary data; whether the particular digit is a digital 1 or 0 depends on the linear orientation of the particular mark. For example, in one embodiment, marks which are oriented from top left to bottom right may represent a 0, while marks oriented from bottom left to top right may represent a 1. The individual marks are of such a size relative to the maximum resolution of a black and white printing device as to produce an overall visual effect to a casual observer of a uniformly gray halftone area when a large number of such marks are printed together in a black and white image on paper; when incorporated in an image border or graphic, this uniformly gray halftone area does not explicitly suggest that embedded data is present in the document. A viewer of the image could perhaps detect by very close scrutiny that the small dots forming the gray halftone area are a series of small marks which together bear binary information. The uniformly gray halftone area may already be an element of the image, or it may be added to the image in the form of a border, a logo, or some other image element suitable to the nature of the document. For example, U.S. Pat. No. 5,315,098, entitled "Methods and Means for Embedding Machine Readable Digital Data in Halftone Images," discloses techniques for encoding digital data in the angular orientation of circularly asymmetric halftone dot patterns that are written into the halftone cells of digital halftone images.

Research and development efforts have also been directed to techniques for inserting, or embedding, encoded information in black and white images in a manner that hides the embedded information in objects or elements in the image, without adding additional elements or objects, while not causing any degradation or distortion. These techniques may be collectively and generally called document or image marking. U.S. Pat. No. 5,278,400, assigned to the assignee of the present invention and entitled "Multiple Threshold Encoding of Machine Readable Code," discloses a method and apparatus for applying coded data to a substrate and decoding the data where the data are encoded in uniformly sized groups of pixels, called cells. Each cell is encoded by distinctively marking a certain number of the pixels to represent the code, without regard to the position in the cell of a marked pixel. For example, a cell comprised of six pixels each of which may be marked in black or white provides for seven possible black-white combinations of the pixels in the cell; a series of three cells provides for $7^3$ possible coded combinations, more than enough to encode the 256 character ASCII character set with only 18 pixels. The characteristics of the marking of each cell are preferably the same to facilitate robustness for decoding purposes.

Another type of image or document marking is known as digital watermarking. A successful digital watermarking technique simultaneously achieves two purposes: first, the technique must produce an embedded signal that is imperceptible to a human viewer so as not to diminish the commercial quality and value of the image being watermarked. At the same time, the embedded signal must be resistant to tampering; removal of the embedded signal defeats the identification purpose of watermarking, and so a successful watermarking technique is typically designed so that attempts to remove the embedded signal cause degradation of the image sufficient to render it commercially less valuable or worthless.

Digital watermarking techniques for text document images may differ from those for use in graphic or scenic images. In text document images, document marking is typically achieved by altering the text formatting in a document, or by altering certain characteristics of textual elements (e.g., characters), in a manner that is both reliably able to be decoded and that is largely indiscernible to a reader. In graphic or scenic images, document marking may be achieved by adding a deterministic signal with a well-defined pattern and sequence in areas of the image that are determined to be insignificant or inconspicuous, such as by toggling the least significant bit.

Brassil et al., in "Electronic Marking and Identification Techniques to Discourage Document Copying" in *IEEE Journal on Selected Areas in Communications,* Vol. 12, No. 8, October 1995, pp. 1495–1504, disclose three techniques for embedding a unique codeword in a text document image that enables identification of the sanctioned recipient of the document while being largely indiscernible to document readers, for the purpose of discouraging unauthorized text document distribution. The image coding schemes were designed to result in a substantial loss of document presentation quality if successfully removed. The techniques disclosed include line shift coding, word shift coding and feature coding. Use of these techniques in the resulting image is typically not noticeable to a viewer of the image, and text in the image is not substantively altered.

PCT International Application WO 95/14289 discloses a signal encoding technique in which an identification code signal is impressed on a carrier to be identified (such as an electronic data signal or a physical medium) in a manner that permits the identification signal later to be discerned and the carrier thereby identified. The method and apparatus are characterized by robustness despite degradation of the encoded carrier, and by holographic permeation of the identification signal throughout the carrier. The embedding of an imperceptible identification code throughout a source signal is achieved by modulating the source signal with a small noise signal in a coded fashion; bits of a binary identification code are referenced, one at a time, to control modulation of the source signal with the noise signal. A preferred embodiment is disclosed which uses identification signals that are global (holographic) and which mimic natural noise sources, thereby allowing the maximization of identification signal energy. In a disclosed preferred embodiment, an N-bit identification word is embedded in an original image by generating N independent random encoding images for each bit of the N-bit identification word, applying a mid-spatial-frequency filter to each independent random encoding image to remove the lower and higher frequencies, and adding all of the filtered random images together that have a "1" in their corresponding bit value of the N-bit identification word; the resulting image is the composite embedded signal. As disclosed at pg. 11 of the application, the composite embedded signal is added to the original image using a formula (Equations 2 and 3) based on the square root of the innate brightness value of a pixel. Varying certain empirical parameters in the formula allows for visual experimentation in adding the composite identification signal to the original image to achieve a resulting marked image, which includes the composite identification signal as added noise, that is acceptably close to the original image in an aesthetic sense. The disclosure notes that the use of a noise, or random, source for the identification signal is optional, and that a variety of other signal sources can be used, depending on application-dependent constraints (e.g., the threshold at which the encoded identification signal becomes perceptible.) In many instances, the level of the embedded identification signal is low enough that the identification signal need not have a random aspect; it is imperceptible regardless of its nature. It is further pointed out, however, that a pseudo random source is usually desired because it is more likely to provide an identification signal that is both detectable and imperceptible in a given context.

Cox, Kilian, Leighton and Shamoon, in *NEC Research Institute Technical Report* No. 95-10 entitled "Secure Spread Spectrum Watermarking for Multimedia," disclose a frequency domain digital watermarking technique for use in audio, image, video and multimedia data which views the frequency domain of the data (image or sound) signal to be watermarked as a communication channel, and correspondingly, views the watermark as a signal that is transmitted through it. Attacks and unintentional signal distortions are thus treated as noise to which the immersed signal must be immune. To avoid perceptual degradation of the signal, Cox et. al propose to insert the watermark into the spectral components of the data using techniques analogous to spread spectrum communications, hiding a narrow band signal in a wideband channel that is the data. Their technique proposes to spread the watermark over very many frequency bins so that the energy in any one bin is very small and certainly undetectable, on the premise that a watermark that is well placed in the frequency domain of an image or of a sound track will be practically impossible to see or hear if the energy in the watermark is sufficiently small in any single frequency coefficient. At the same time, they propose that the watermark be placed in perceptually significant components of a signal if it is to be robust to common signal distortions and malicious attack, on the premise that significant tampering with these perceptually significant frequencies will destroy the fidelity of the original signal well before the watermark. In particular with respect to watermarking an N×N black and white image, the technique first computes the N×N DCT of the image to be watermarked,; then a perceptual mask is computed that highlights the perceptually significant regions in the spectrum that can support the watermark without affecting perceptual fidelity. Each coefficient in the frequency domain has a perceptual capacity defined as a quantity of additional information that can be added without any (or with minimal) impact to the perceptual fidelity of the data. The watermark is placed into the n highest magnitude coefficients of the transform matrix excluding the DC component. For most images, these coefficients will be the ones corresponding to the low frequencies. In a disclosed example, the 1000 largest coefficients of the DCT (excluding the DC term) were used. The precise magnitude of the added watermark signal is controlled by one or more scaling parameters that appear to be empirically determined. Cox et. al note that to determine the perceptual capacity of each frequency, one can use models for the appropriate perceptual system or simple experimentation, and that further refinement of the method would identify the perceptually significant components based on an analysis of the image and the human perceptual system. Cox et. al also provide what appears to be a detailed survey of previous work in digital watermarking.

Many of the existing techniques for embedding information in images appear to operate in the black and white image domain, and so do not explicitly address how to embed a signal in a color image that is imperceptible to a human viewer and that does not distort the quality of the image. Digital watermarking techniques, even those that may apply to color images, are typically designed to be irreversible; they produce a tamper-proof embedded signal which cannot be removed without distorting the information in the image; the watermarked image must remain watermarked for all subsequent uses. Moreover, the detection of an embedded identification signal in a watermarked image typically requires the use of the original image, which is typically maintained in a secure location for such future use as needed. While these characteristics of digital watermarking are useful features for image authentication and identification purposes, they may be limitations for other purposes. There are a variety of other image processing applications, especially in the burgeoning field of color image processing, that could make use of a technique for modifying a color image to have an imperceptible signal added thereto, where the modified color image does not have all of the aforementioned limitations of a watermarked image. The present invention addresses this need.

SUMMARY OF THE INVENTION

The steadily rising use of color images in all types of commercial and aesthetic applications suggests that many of the techniques that have been developed for embedding information in black and white images need to be extended to the color domain. The present invention is premised on the observation that modifying a color image by adding signals that do not unacceptably distort or degrade the image to a human viewer presents a human perception problem that is different from that associated with black and white images. The mere extension of existing techniques in the black and white image domain using empirical or heuristic approaches to determine whether an added signal is humanly perceptible is inadequate to embed signals in color images that do not unacceptably distort or degrade the image. Moreover, image artifacts that appear in a color image as a result of adding a signal using an inadequate method are likely to be attributed to the hardware device that produced the image; if the quality of the color image is aesthetically unacceptable, the hardware device or the application that produced these artifacts will simply not be used.

A technique for embedding data in images is premised on the discovery that adding signals to a color image that do not unacceptably distort or degrade the image can only be predictably and reliably accomplished by using a sophisticated model of human perception that is able to quantitatively determine the magnitude of the perceptual differences between an original image and a version of the image with the embedded signals. The technique uses a quantitative model of human perception to attenuate the power (amplitude) of the added signal in local regions of the color image where the model indicates that the perceptual difference between an original color and the modified color produced with the added signal is too high, toward the goal of producing a version of an original color image having an added signal that is substantially imperceptible to human viewers of the image. The quantitative model of human perception controls the perceptibility of the embedded signal by ensuring that it is below a perceptual threshold.

The technique of an illustrated embodiment adds a pattern of periodic signals to a color image, and in particular, adds a pattern of amplitude-modulated sinusoidal signals to the color image. A comparing operation automatically determines local areas in the modified color image where the amplitude of the embedded information is too high, and is thus perceptible. The perceptible signals are then iteratively attenuated in those identified local areas of the modified image. In one aspect of the illustrated embodiment, the sinusoidal signals are added to the yellow-blue opponent-color band of the color image, at spatial frequencies where most color images have relatively little power, and where humans have the least sensitivity. The added amplitude-modulated sinusoidal signals can be decoded (located in a modified image) because they form a specific pattern of peak power concentrations in the frequency domain. The manner of adding the signals results in particular geometric relationships occurring between the spatial frequencies that are unlikely to occur by chance in natural or computer-generated synthetic images. The embedding technique takes advantage of human perception: the spatial frequencies of the embedded sinusoidal signals are well within the range of frequencies to which humans are normally quite sensitive in the luminance (black-white) vision band, but this sensitivity does not extend to the color vision bands. Thus, while sinusoidal signals at relative high spatial frequencies are added to the modified color image in the embodiment of the invention described below, signals can be added at lower spatial frequencies if a particular application, a specific decoding domain, or a specific device requires it.

An image with the embedded sinusoidal signal may be useful in a variety of applications according to the present invention. A set of sinusoids forms a grid when embedded in an original image. After the decoding operation of the present invention has extracted the spatial frequencies of the embedded sinusoids, a mapping is computed between the acquired (e.g., scanned) modified image and the sinusoidal grid image that was embedded in the original image. This mapping then allows geometric transformations to be performed on the acquired image to match the geometric properties of the acquired image to the geometric properties of the original image. For example, the acquired image can be automatically aligned and scaled to that of the original image, if the acquired image has become rotated, skewed, reduced or enlarged during previous manipulations. Thus, images containing the added sinusoidal signals do not have to be perfectly aligned when scanned, nor manually scaled or rotated after scanning. In addition, the sinusoidal grid can function as a reference point with respect to which other embedded information can be located with precision. Moreover, a combination of embedded sinusoidal signals can be chosen such that the total embedded signal has a period greater than or equal to the image field so that, during a decoding operation, each position in the acquired image is uniquely associated with a unique position in the embedded signal image.

A significant advantage of the technique of the signal decoding process is that the process of locating the sinusoidal signal image that is embedded in an acquired image (i.e., the decoding process) does not require use of the original, unmodified image. This characteristic provides anyone with the ability to use the embedded information.

Therefore, in accordance with one aspect of the present invention, there is provided a method for operating a machine to automatically transform geometric properties of an acquired image version of an original image to match geometric properties of the original image. The method comprises obtaining an acquired image data structure defining an acquired image; the acquired image is a version of an original image and additionally has embedded signals therein not included in the original image. The embedded signals have predetermined geometric relationships with respect to each other. The processor further obtains geometric constraint data indicating expected geometric relationships about the embedded signals in the acquired image. Then, the geometric relationships of the embedded signals in the acquired image are determined. The processor then computes geometric differences between the acquired image and the original image using the geometric relationships of the embedded signals in the acquired image and using the geometric constraint data indicating the expected geometric relationships of the embedded signals. Using these geometric differences, geometric properties of the acquired image are transformed to match the geometric properties of the original image.

In accordance with still another aspect of the invention, a method for operating a processor-controlled machine is provided for decoding a set of n periodic signals embedded in an image. The method comprises obtaining an image data structure defining an image including a set of n periodic signals embedded therein. The set of n periodic signals have geometric relationships with respect to each other. The method further includes obtaining geometric constraint data indicating expected geometric relationships about the set of n periodic signals. Then, a plurality of local peak power concentrations in the two-dimensional spatial frequency power spectrum of the image are identified; a subset of these local peak power concentrations that do not satisfy the geometric constraint data indicating the expected geometric relationships about the set of n periodic signals are eliminated from consideration. A remaining subset of the local peak power concentrations are determined to be candidate local peak power concentrations indicating spatial frequencies and directions of the set of n periodic signals. Then, a best linear mapping is computed between sets of n candidate local peak power concentrations in the image and a set of n periodic signals indicated by the geometric constraint data. The best linear mapping identifies the spatial frequencies and directions of the set of n periodic signals embedded in the image.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

DETAILED DESCRIPTION OF THE INVENTION

Figure 1:
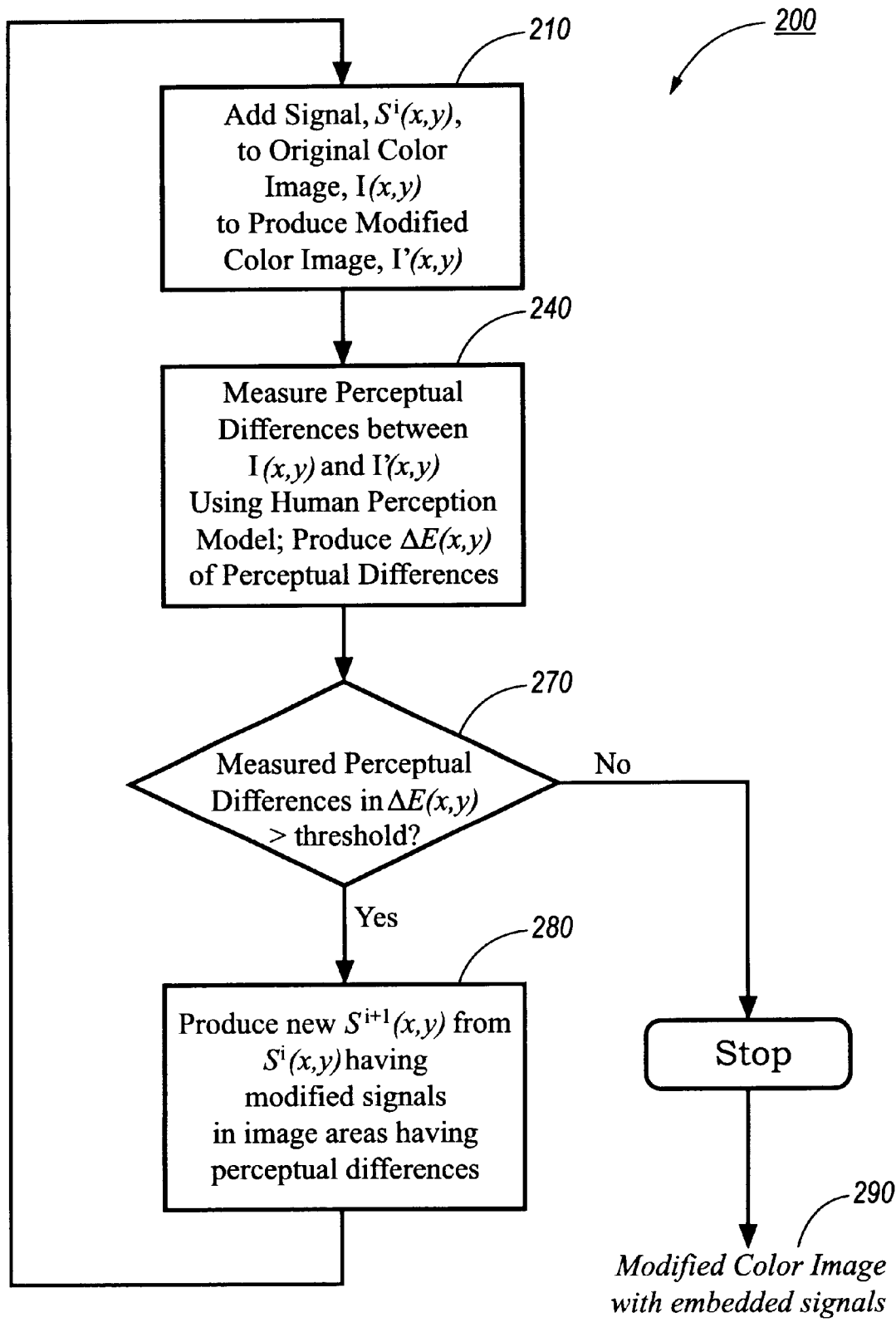
FIG. 1 is a flowchart illustrating the general operation of the invention for adding a signal component to a color image.

A. Adding an imperceptible signal component to an original color image.

A technique for embedding signals in a color image has as a goal to embed the signals so that they are substantially imperceptible to a human viewer of the modified color image produced as the output of the technique. Whether the signal is perceptible is measured by a comparison operation that uses a model of human perception to provide a quantitative perceptual difference measurement between an original color image and a modified color image with the signal embedded therein. Perceptual difference measurements that exceed a threshold will be perceptible by a human viewer, and therefore cause the color image modified with the embedded signal to be an unacceptable degradation of the original color image. The threshold setting permits flexibility in the technique to accommodate the particular application that uses the technique, or to accommodate images with a particular type of structural or color content. Therefore, the threshold sets a limit on the acceptable perceptual difference that will be tolerated between the original color image and a color image modified with the embedded signals; the threshold may be changed to allow more or less perceptual difference between the original and modified color images, and therefore more or less degradation of the original color image. In many instances, including the illustrated embodiment described below, the technique can ensure that the embedded signal is imperceptible to a human viewer, and for purposes of this description, the embedded signal will be referred to as an imperceptible signal. It is to be understood, however, that the technique of the present invention provides a way of measuring the perceptual difference between the original and modified color images and to control the acceptability of this perceptual difference.

1. General overview and features.

The technique for embedding an imperceptible signal component in an original color image takes two data structures as input: the original color image (with no signal component embedded) and an image that contains the signal component to be added. The technique produces a version of the original color image with the added signal component imperceptibly embedded therein; this version of the original image is referred to herein as the modified image.

The term "original color image" will be used to refer to the image data structure that defines the input color image to which the imperceptible signal is to be added. Color images of the type suitable as input to the embedding technique are assumed to be two-dimensional, having an image coordinate system in which an image location is given by a set of image coordinates, (x, y). Each location in an image may be called a "pixel." A two-dimensional array of data items spatially defines the color image, each item of data providing a value, called a "pixel value", indicating the color of the image location. Each pixel value is a tuple of color space coordinates defining a color in a selected color space, such as RGB color space or an accepted international CIE standard color space. The original image will also be referred to herein as I(x,y).

The signal component to be embedded in the original color image can itself be viewed as an image. As will be described in more detail below, the signal component will be embedded over several processing iterations, and so may also be referred to as $S^i(x,y)$, where i is the number of the current iteration. The characteristics of the added signal component vary according to the application for which the modified image carrying the signal is to be used; for some applications, the added signal component must be a periodic signal. In the illustrated embodiment of the technique that is described below, the signal added to the original color image is a sinusoidal signal component.

FIG. 1 is a flowchart illustrating operation 200 for adding an imperceptible signal component to an original color image. In general terms, operation 200 handles the original color image as well as the signal component as image representations and adds them, in box 210, to produce modified color image, which is designated herein as I'(x,y).

To ensure that the added signal component is not perceptible in any part of the modified image by a human viewer of the image, perceptual differences between I(x,y) and I'(x,y) at each image location are measured, in box 240, using a comparison operation that models human perception. Comparison operation 240 produces data that indicates, for each image location in I'(x,y), a quantitative measurement of the perceptual difference between I(x,y) and I'(x,y). The quantitative measurement indicates whether the perceptual difference between I(x,y) and I'(x,y) is perceptible to a human viewer of the modified color image I'(x,y). The output of comparison operation 240 is designated herein as $\Delta E(x,y)$ of perceptual differences. Additional details about the human perception model and a description of a model used in the illustrated embodiment are described below.

The perceptual difference data is then evaluated, in box 270, in two ways. One evaluation involves whether any of the image locations have perceptual differences in $\Delta E(x,y)$ that are greater than a threshold perceptual difference that has been determined to be an acceptable perceptual difference measurement. Image locations with difference measurements greater than this threshold, indicating that the added signal is perceptible to a human viewer of the modified color image, means that the added signal component needs to be attenuated, in a subsequent processing iteration, in those image locations. A second evaluation determines when sufficient iterations have been made so that the added signal produces no or few perceptual difference measurements over the threshold, and so is substantially imperceptible and processing is complete. This evaluation can be made in a number of different ways; for example, processing can be terminated when a threshold percentage of image locations in $\Delta E(x,y)$ have measured differences less than the threshold difference, or when some average (e.g., arithmetic or geometric) of the $\Delta E$ values is below a threshold. Both of these thresholds can be adjusted to suit the specific application in which the modified color image is to be used, or to accommodate the particular spectral or structural attributes of the original color image.

As box 270 in FIG. 1 indicates, when both evaluations show that the modified color image has a sufficient number of image locations with difference measurements below the threshold acceptable difference, operation 200 for producing the modified color image is complete, and processing stops. The final version of modified color image 290 has an added signal component that produces an acceptable perceptual difference between the original color image and the modified color image; in most cases, the added signal component is imperceptible to human viewers of the image.

When image locations in I'(x,y) have perceptual differences in $\Delta E(x,y)$ that are greater than the threshold acceptable difference measurement, a new signal image is produced, represented in box 280 of FIG. 1, in which the signal of the previous signal image is attenuated in image areas where there were unacceptable difference measurements. This new signal image is produced using the signal image $S^i(x,y)$ of the previous iteration, to form the signal image, designated as $S^{i+1}(x,y)$ herein, for the next (i+1) iteration. Processing then returns to box 210 where modified signal $S^{i+1}(x,y)$ is added to the original image.

Figure 2:
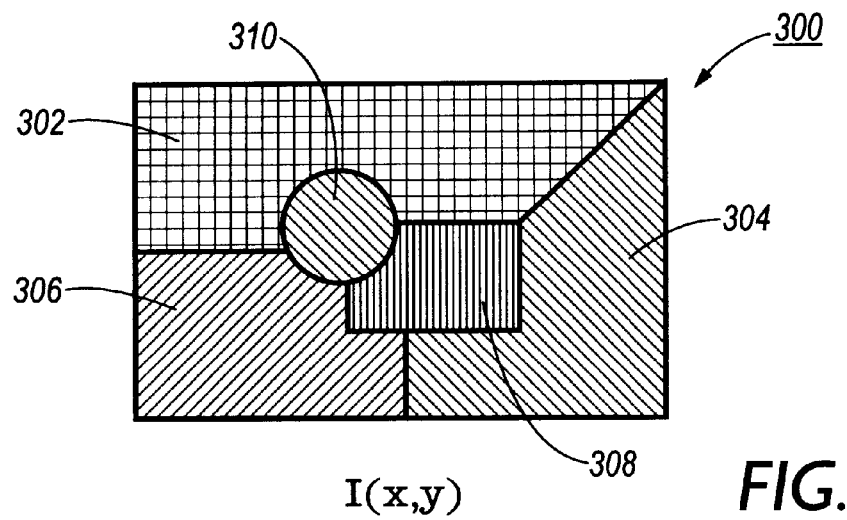
FIG. 2 schematically illustrates a representative original color image that is suitable for input to the technique illustrated in FIG. 1.
Figure 3:
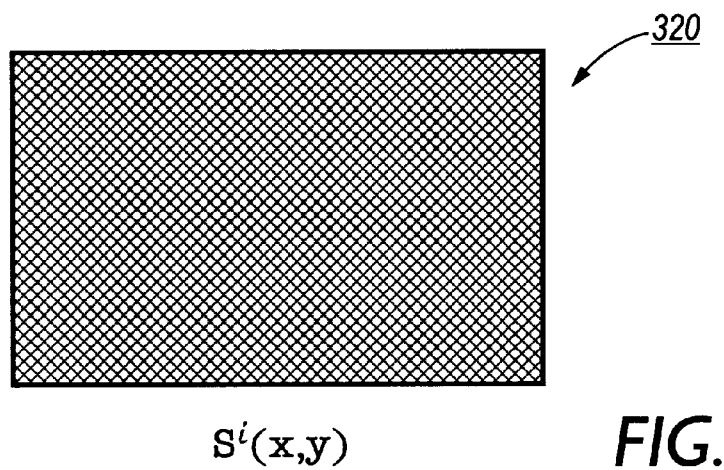
FIG. 3 schematically illustrates a representative signal component image that is suitable as the signal component to be added to the original color image of FIG. 2.

FIGS. 2–6 illustrate operation 200 in terms of representative schematic image representations. Original color image 300 of FIG. 2 shows image regions 302, 304, 306, 308 and 310, each shown in a different color, as represented by different cross-hatching patterns. FIG. 3 shows image 320 representative of an image of the signal component to be added to original image 300. Note that image 320 is shown with a cross-hatching pattern that is intended to be representative of any type of signal component, in contrast to image 480 of FIG. 10 which is an image of a specific signal component that is the subject of an illustrated embodiment described in more detail below.

Figure 4:
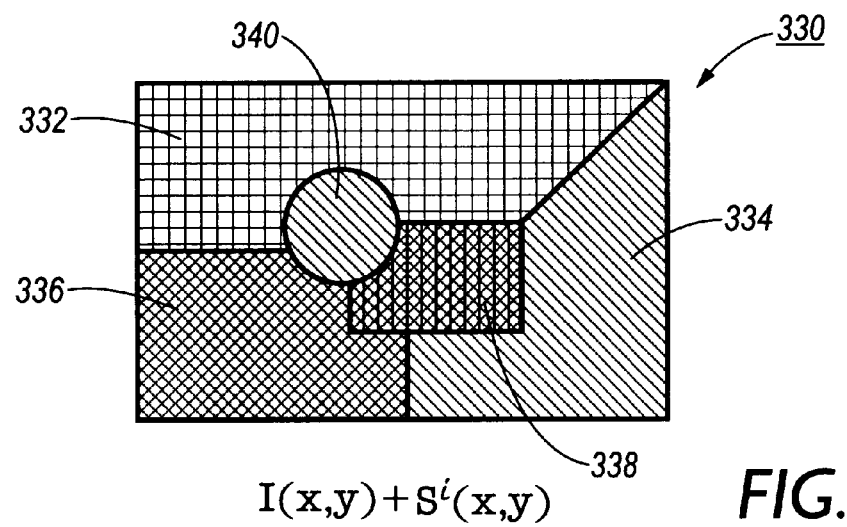
FIG. 4 schematically illustrates a modified version of the original color image of FIG. 2 with the added signal component image of FIG. 3.
Figure 5:
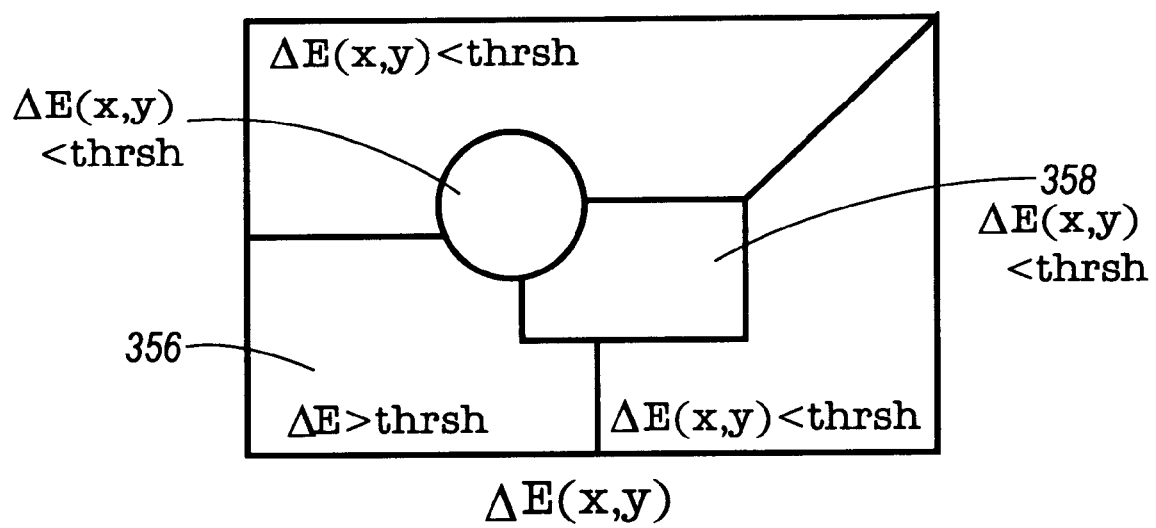
FIG. 5 schematically illustrates a perceptual difference image showing the perceptual differences between the original image of FIG. 2 and the modified color image of FIG. 4.

FIG. 4 shows image 330 produced by operation 210 of FIG. 1 which is representative of the image produced by adding image 320 to image 300. In effect, the image produced as a result of the process of embedding signals in the original color image according to the present invention is defined to be two image data structures combined and rendered in registered alignment. In image 330, image regions 332, 334 and 340 are shown having the same colors (i.e., with the same cross-hatching) as in image 300 of FIG. 2, while image regions 336 and 338 are shown with the cross-hatching color of signal image 320 superimposed over the cross-hatching colors of image regions 306 and 308. Image 330 schematically illustrates that signal component 320 is perceptible in image regions 336 and 338 but not in image regions 332, 334 and 340. FIG. 5 shows image 350 representative of perceptual differences, $\Delta E(x,y)$, produced by operation 240 which measures the perceptual differences between image 300 and image 330 using the human perception model. The quantitative perceptual difference $\Delta E$ in image regions 358 and 356 are above the acceptable perceptual difference threshold.

Figure 6:
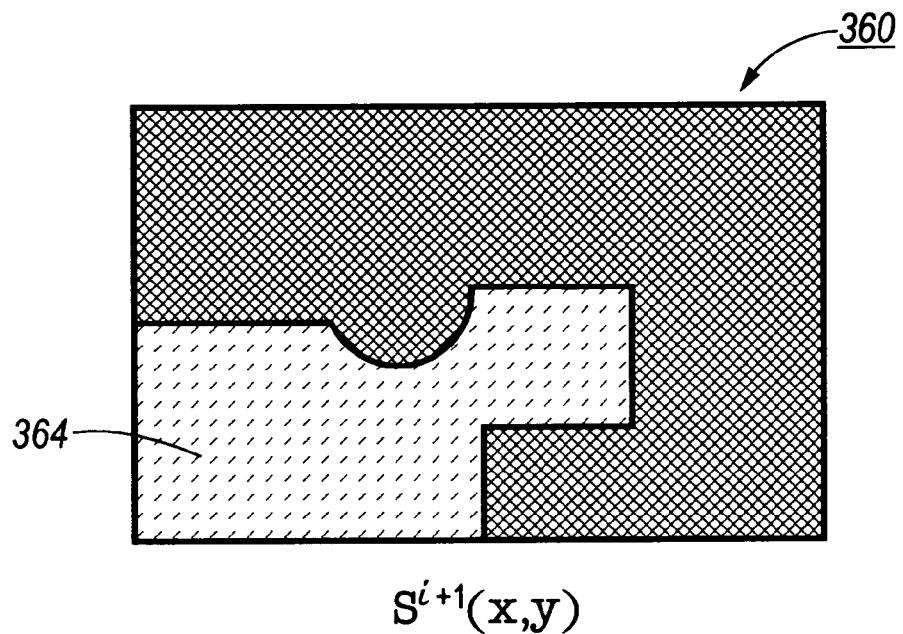
FIG. 6 schematically illustrates the signal component image of FIG. 3 modified with an attenuated signal component in certain image regions.

FIG. 6 shows image 360 representative of the signal image $S^{i+1}(x,y)$ produced by operation 280 of FIG. 2. Signal image 360 is to be embedded in the original image in the next iteration of processing, and shows, by way of the different cross-hatching pattern in region 364, that the signal component is attenuated in the image regions corresponding to the image regions in image 330 where the added signal component produces an unacceptably large perceptual difference and is therefore perceptible to a human viewer of image 330.

2. Implementation details of an illustrated embodiment.

An illustrated embodiment of the operation 200 adds to an original color image one or more sinusoidal grids as the signal component, where the sinusoids have predetermined spatial directions and spatial frequencies. The illustrated embodiment is shown in flowchart 400 in FIG. 7. Original color image 404 is converted, in box 406, to an opponent color representation which produces three color separations: luminance (black and white), red-green (RG) and yellow-blue (YB). This conversion is a linear transformation, typically from RGB color space. A sum of sinusoidal signals 402, S(x,y), is embedded into the yellow-blue (YB) color band in box 408. The illustrated embodiment chooses high spatial frequencies where human sensitivity is low and where most images contain relatively little power. The three color separations including the YB band with the embedded signal form an interim modified image 414 which is then converted to an input representation suitable for input to the S-CIELAB perceptual difference measurement operation 450. In particular, interim color image 414 is converted, in box 409, to a representation that approximates the absorptions of the long, middle and short (LMS) wavelength sensitive cone photoreceptors in the retina of the human eye. This LMS representation, along with the LMS representation of original image 404, also converted in box 409, are input to comparison operation 450 to detect and measure perceptual differences between the two images. When the perceptual difference measurements exceed the thresholds, the sinusoidal grid 402 must be attenuated in those areas that produce perceptible differences, and again added to the YB band of original image 404. Thus, the signal is embedded in an iterative manner. The product of sinusoidal grid image 402 and an attenuation image 418 produced in operation 420 is added to original image 404. If the perceptual difference measurements again exceed the thresholds, another iteration is needed; a new attenuation image 418 is produced in box 420, which is again multiplied with sinusoidal grid 402 produced in the last iteration, to form the new sinusoidal grid to be added to the YB band of the original image 404 in the next iteration. The iterative processing is represented by line 410.

Note that, while the technique of the present invention refers to embedding signals in color images, the signal component is not restricted to being embedded in only the color (i.e., RG or YB) bands of the opponent-color image representation. While the technique of the illustrated embodiment embeds the signal component in the YB band of the original image, the signal may be embedded in any one or more of the BW, RG or YB bands of the original image. The perceptibility of the embedded signal in a particular one of the opponent color representations may depend on the spatial or color structure of the particular image. Note also that other types of image separations are also possible, such as, for example, HSV (hue, saturation and value) and L*a*b*.

Figure 7:
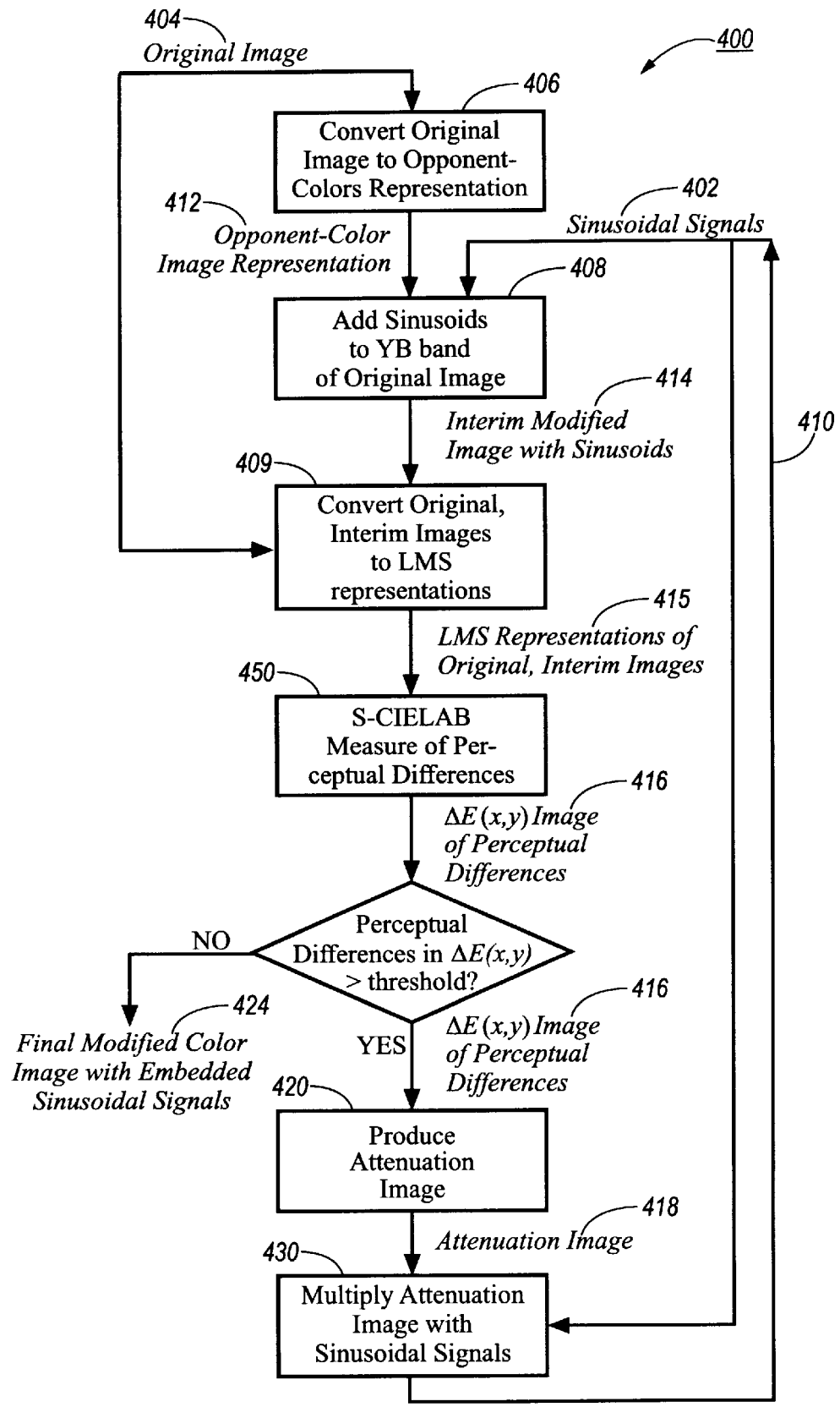
FIG. 7 is a block diagram schematically illustrating the general operation of an illustrated embodiment of the encoding technique.

The illustrated embodiment uses a human perception model known as S-CIELAB to make the perceptual difference comparisons between the original image and each iterative, interim version 414 of the modified image, producing the perceptual difference measurement image 416, ΔE(x,y). The functional and operational characteristics of S-CIELAB are described below. Note that the conversion of an RGB image to its LMS representation required in box 409 of FIG. 7 is a standard operation in the literature of human perception, and is provided as a utility with the S-CIELAB source code.

Figure 19:
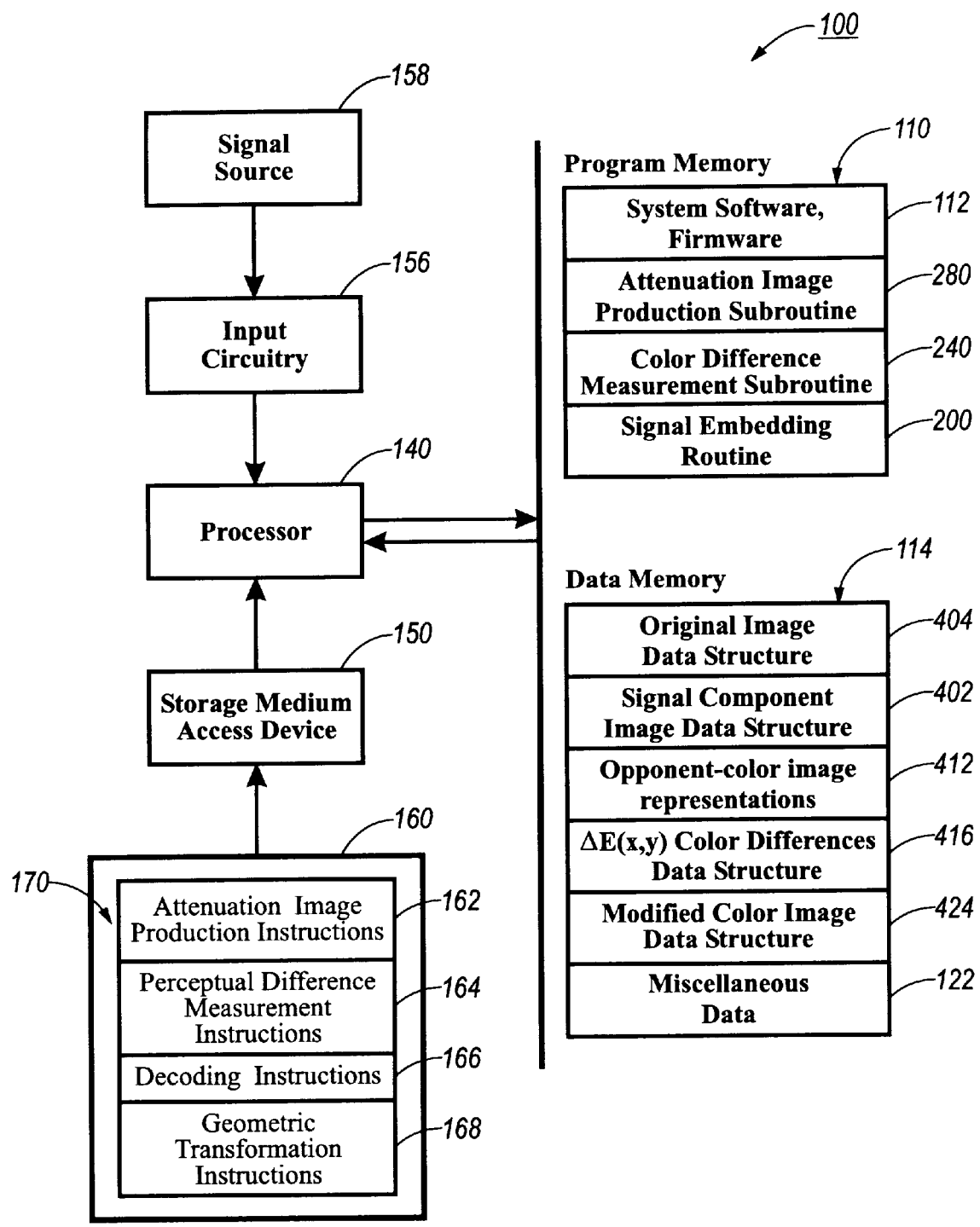
FIG. 19 is a simplified block diagram illustrating a suitably configured machine in which the present invention may be used, and further illustrating the software product of the present invention and its use in conjunction with the machine.

The embedding technique, including the process of embedding the sinusoidal grid and measuring the perceptual differences, as well as the decoding process of the present invention to determine the location of the sinusoidal grid in an acquired modified color image, have been implemented in the programming language known as Matlab; these implementations execute on a suitably configured general purpose computer, such as machine 100 schematically represented in FIG. 19, and described below.

i. Human color perception model.

As noted earlier, the purpose of comparison operation 240 of FIG. 1 is to measure the perceptual differences between the original color image and the current version of the modified color image to determine if the perceptual differences exceed the threshold of acceptable perceptual differences and are consequently perceptible by a human viewer of the image. Many models of human color perception have been proposed in the color research literature; models that are suitable for use with the present invention must provide the functional ability to measure a color appearance difference between two colors that represents the perceptual difference that a human observer would perceive between the two colors, and to express the measured difference in a quantitative range, or scale, of small to large perceived color appearance differences that accurately corresponds to actual human color vision. The technique of the present invention must be able to select a threshold perceptual difference from the scale of quantitative differences produced as a result of using the model that represents a perceptual difference that is "acceptable", either because the threshold represents a perceptual difference that falls below the threshold of human perception, or because perceptual differences at or above the threshold are perceptible to a degree that is acceptable for the particular application. In addition, a model that is suitable for use with the present invention will premise its color measurements on the actual physical responses of the human eye to color, and will generally allow for specification of the white and black points in the image and/or an illuminant used to produce the image. CIE (*Commission Internationale de l'Eclairage*) standards for defining and measuring colors form the basis for many such models of human color perception. Note that how well a particular human color perception model accurately represents and measures perceptual differences is likely to influence the operation of the present invention; the more accurate information about perceptual differences that comparison operation 240 of FIG. 1 provides, the more likely the technique can ensure that the embedded signal is imperceptible.

In the illustrated embodiment, the present invention makes use of a human color perception model known as S-CIELAB. The S-CIELAB model was developed by X. Zhang and B. Wandell, and is based on the color vision research of A. Poirson and B. Wandell. Additional information about S-CIELAB and Poirson and Wandell's research beyond that described below is available in: A. Poirson and B. Wandell, "The appearance of colored patterns: pattern-color separability", *Journal of the Optical Society of America A*, 10:2458–2471, 1993; A. Poirson and B. Wandell, "Pattern-color separable pathways predict sensitivity to single colored patterns", *Vision Research*, 36:515–526, 1996; X. Zhang and B. Wandell, "A spatial extension of CIELAB for digital color image reproduction", *Proceedings of the Society of Information Display 96 Digest*, pp. 731–734, San Diego, 1996. Each of these publications provides references to color science and human vision texts that may be consulted as necessary. Source code for an S-CIELAB implementation is available for downloading from Brian Wandell's web site (URL at filing date: http://white.stanford.edu/html/wandell.html).

S-CIELAB is an extension of the well-known CIELAB standard that attempts to define a perceptually uniform color space in which color reproduction errors can be accurately measured. S-CIELAB was designed to measure the perceptual difference errors between an original color image and its color reproduction on a particular device. S-CIELAB attempts to account for the dependence of color appearance on the spatial structure of an image, both globally and locally. CIELAB was based on psychophysical studies of color discriminability with large uniform color patches. More recent studies have shown that color appearance also depends on the local structure of the image. Measurements of color appearance with fine-scale patterns (e.g., color square-wave gratings of different spatial frequencies) differ from those with large uniform color patches. Poirson and Wandell propose a pattern-color separable model for early human color processing to explain these human color vision responses. Zhang and Wandell state that applying CIELAB to predict local color reproduction errors in patterned images does not give satisfactory results, and cite as an example the comparison of a continuous-tone color image with a halftone version of the image. A point-by-point comparison of the CIELAB error between these images produces large errors at most image points. However, because the halftone patterns vary rapidly, these differences are blurred by the eye, and the reproduction may still preserve the appearance of the original.

Figure 8:
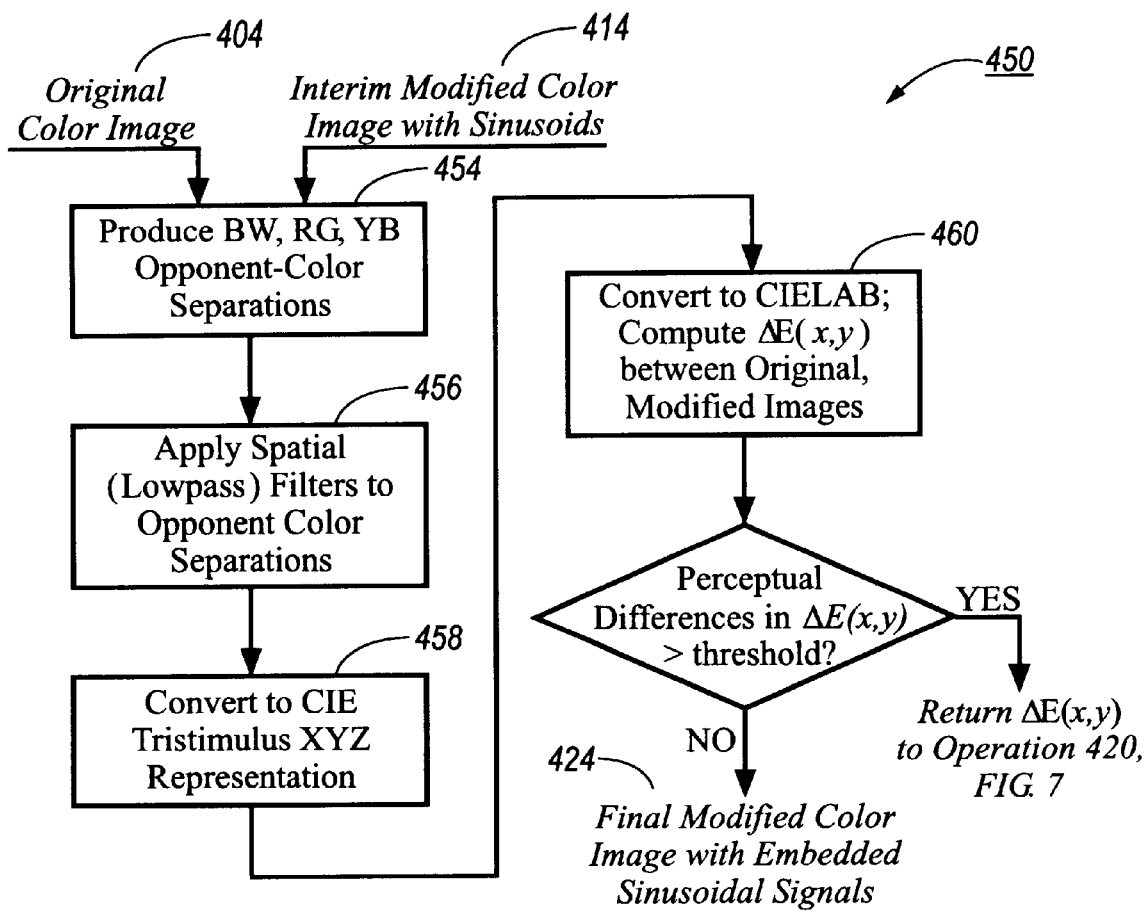
FIG. 8 is a flowchart illustrating the general operation of the S-CIELAB color image comparison operation of the illustrated embodiment of FIG. 7.

FIG. 8 illustrates the general processing of S-CIELAB comparison operation 450 as implemented in the illustrated embodiment using the S-CIELAB color perception model. In the S-CIELAB pattern-color separable model, the color signals of both the original and the current version of the modified color images are input in an LMS representation. The color signals in this representation are then transformed, in box 454, from LMS coordinates into an opponent-color representation having three bands (i.e., spatial images), referred to as luminance (BW), red-green (RG), and yellow-blue (YB). Each opponent-color image is then convolved, in box 456, with a kernel whose shape is determined by the visual spatial sensitivity to that color dimension; the area under each of these kernels integrates to one. This amounts to smoothing each opponent-colors image with a lowpass filter, where the RG and YB bands have lower frequency cutoffs. The calculation is pattern-color separable because the color transformation does not depend on the image's spatial pattern, and the spatial convolution does not depend on the image's color.

Finally, the filtered representation of the color signals at each image location are transformed into CIE XYZ-tristimulus coordinates, in box 458. The CIE XYZ tristimulus representation is then transformed, in box 460, into CIELAB color space using the CIELAB formulae. The conventional CIELAB color difference formula is then used to measure the perceptual difference at each image pixel between a color in the original color image and a color in the current version of the modified color image. These perceptual differences are denoted by $\Delta E$, where values greater than 1 imply that the perceptual differences are detectable by humans. A perceptual difference value of less than 1 implies that a difference is not discriminable. The perceptual difference image, $\Delta E(x,y)$, is then returned to operation 420. The S-CIELAB difference measure reflects both spatial and color sensitivity, and, according to Zhang and Wandell, it equals the conventional CIELAB over uniform regions of the image.

Use of the S-CIELAB color perception model requires some calibration parameters. S-CIELAB requires the mapping between the digital representation of the color image and the spectral reflectance of the image when printed or displayed. Thus, a detailed model of the printer or display device and the spectral distribution of the illuminant need to be specified to the model. In the illustrated embodiment of the present invention, the S-CIELAB model assumes that the image is displayed on a CRT monitor with a conventional set of RGB phosphors. The S-CIELAB model also requires the specification of a white point. In the illustrated embodiment of the present invention, the S-CIELAB model assumes, for the digital images being processed, that the white point is the color tuple at that pixel with the highest luminance in the original color image; that is, the largest Y component, in CIE XYZ-tristimulus coordinates, of all of the image pixels is designated as the white point. For images printed on white paper, the white point is normally specified as the reflectance of the paper alone.

Experience with the S-CIELAB model shows that, in practice, perceptual differences with $\Delta E<3$ in the modified color image with the embedded sinusoid signal component are not readily apparent. However, when, as in the case of the illustrated embodiment, there is incomplete knowledge of the proper calibration parameters, it is important to keep the $\Delta E$ values small (e.g., <1) to be conservative. As noted earlier, the threshold can be changed to accept more image degradation in the final modified color image.

ii. Producing the attenuated signal component.

Figure 9:
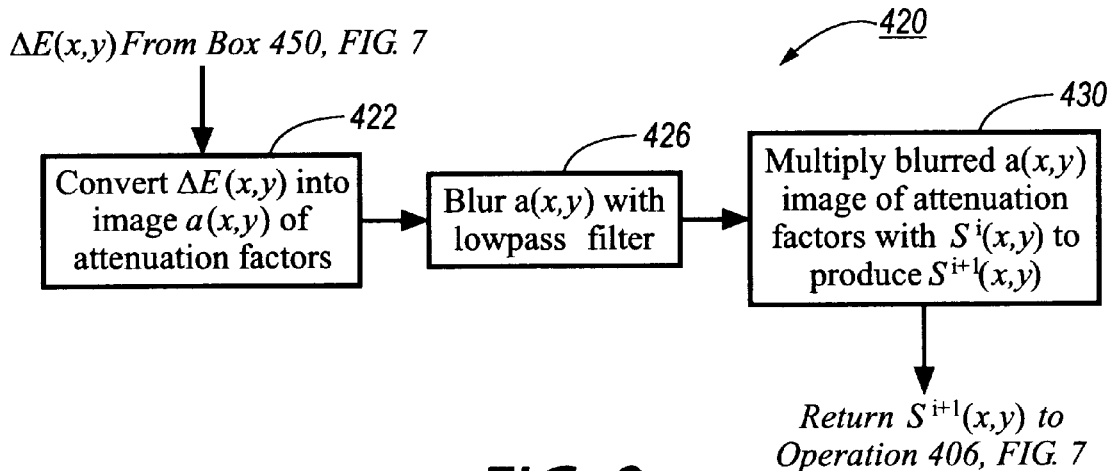
FIG. 9 is a flowchart illustrating the technique for producing the attenuation image according to the illustrated embodiment of FIG. 7.

As noted earlier, in the illustrated embodiment shown in FIG. 7, perceptual difference image 416, $\Delta E(x,y)$ represents the perceptual differences between original image 404, I(x, y), and the current, or interim, modified image 414, I'(x,y). The signal to be embedded is attenuated wherever the perceptual differences between the original image and the modified image is significant, i.e., where $\Delta E(x,y) >1$. The flowchart of FIG. 9 illustrates operation 420 for producing the signal component image, $S^{i+1}(x,y)$, for the next iteration, according to the illustrated embodiment. At each iteration, if there are a sufficient number of image locations where $\Delta E(x,y) >t$, where t is some threshold, then $\Delta E(x,y)$ is converted into an image of attenuation factors a(x,y), in box 422, also called attenuation image 418 (FIG. 7), as follows:

$$a(x,y)=(2/2+\max[0, \Delta E(x,y)-t])^2 \qquad (1)$$

The threshold t thus represents the threshold below which no $\Delta E(x,y)$ will cause attenuation of the signal image. In the illustrated embodiment, the threshold used is 1.

The image of attenuation factors, a(x,y), is then blurred with a lowpass filter, in box 426. The blurring of a(x,y) is important because S-CIELAB measures perceptual differences in local neighborhoods, due to the spatial blurring in each opponent-color band. The image of attenuation factors, a(x,y), is blurred with the same lowpass filter that S-CIELAB uses for the YB band. The blurring also keeps the bandwidth of the embedded signal relatively small. This keeps its frequency content away from low frequencies to which humans are very sensitive. Smaller bandwidths also keep the power of the sinusoids more concentrated and easier to detect.

The blurred attenuation image 418 is then multiplied, in box 428, with the signal that was embedded in the previous iteration. Operation 400 of the illustrated embodiment (FIG. 7) repeats until 99.5% of the pixels have $\Delta E(x,y) \leq t$, which has been found to take 3 to 5 iterations. The final embedded signal is given by $$G(x, y) = \left(\prod_{i=1}^{n} a_i(x, y)\right) S(x, y) \quad (2)$$

where n is the number of iterations, S(x,y) is the sum of sinusoids, and a(x,y) is the blurred attenuation image at iteration i. The amplitude of the embedded signal can only decrease at each iteration, which ensures convergence so that $\Delta E(x,y) \leq 1$ almost everywhere. Equation (1), which converts $\Delta E$ values into attenuation factors, was chosen empirically to obtain a reasonable rate of convergence. Attenuation of the sinusoidal signals must not fall below a limit below which the signals would not be detectable by an image acquisition device such as a scanner.

Selection of the number of sinusoids to embed and the sinusoid spatial directions and spatial wavelengths may be influenced by the type of application in which the modified image, or a version of the modified image, will be used. In the illustrated embodiment of the present invention, four sinusoids were embedded into a color image, forming a sinusoidal grid over the image which, when decoded from an acquired image, may be used to determine certain geometric relationships between the acquired image and the modified image. The original image had R, G and B values at each pixel each expressed in the range of 0–255 (i.e., 8 bits per color band per pixel). After conversion to the opponent color representation, the YB (yellow-blue) channel typically has values between −8 and 8. Four sinusoids are added with amplitudes of approximately 0.5 pixels each. Therefore, the typical amplitude of the embedded signal in this example was equal to 2.

Figure 10:
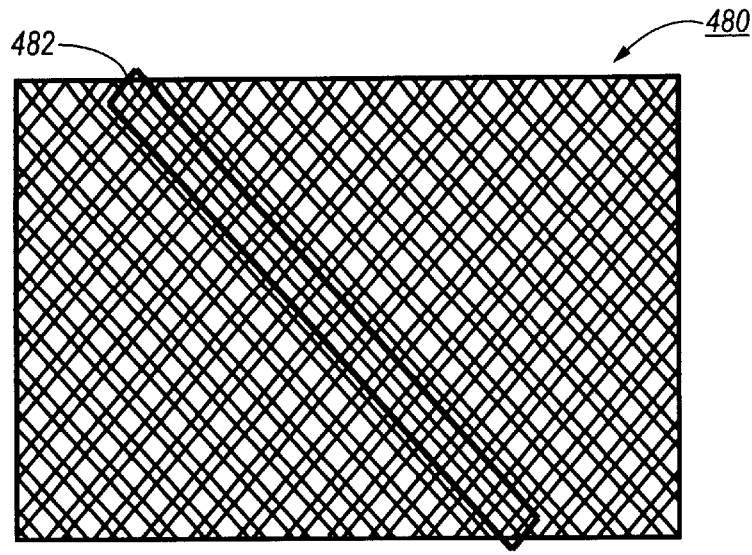
FIG. 10 schematically illustrates an image of a set of sinusoidal signals that are suitable for embedding in a color image according to the illustrated embodiment of FIG. 7.
Figure 13:
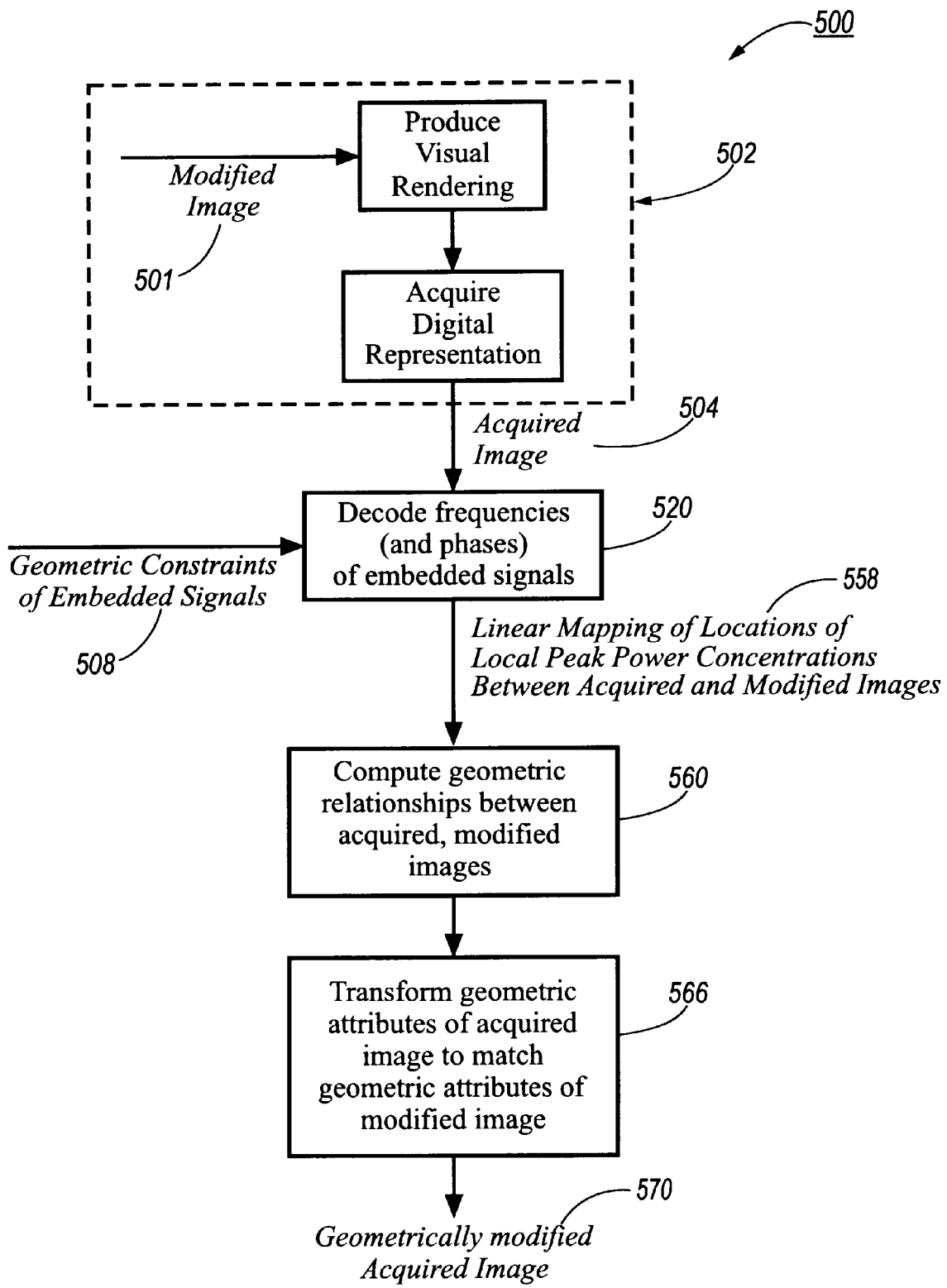
FIG. 13 is a flowchart that illustrates the operations according to the present invention of a class of applications which uses an image having signals embedded according to the technique illustrated in either FIGS. 1 or 7.

A schematic representation of these four sinusoidal signals that form the signal image S(x,y) is illustrated in spatial image 480 of FIG. 10. Image 480 shows pairs of equally-spaced diagonally positioned lines extending across image 480 in orthogonal directions, forming an image of a grid. The lines mark the zero crossing positions of sinusoids having different spatial frequencies and positioned in different spatial directions in image 480. It can be seen from the relative positions of the pairs of diagonal lines that the four sinusoids have orientations of ±45° from a coordinate axis (not shown) in the x direction of image 480. FIG. 13 shows diagonal cross-section 482 of image 480, showing the relationship of a pair of sinusoids; dashed line 481 marks the horizontal sinusoidal axis. In the illustrated embodiment, the wavelengths of the sinusoids are 3.8 and 2.7 pixels, represented by wavelengths 486 and 488. S-CIELAB was calibrated so that the embedded signal would be invisible when viewed from 10 inches, at which the frequencies are 7 and 10 cycles/degree. In actual experience, the process was sufficiently robust that the embedded signal remained imperceptible even when viewed more closely than 10 inches.

Figure 15:
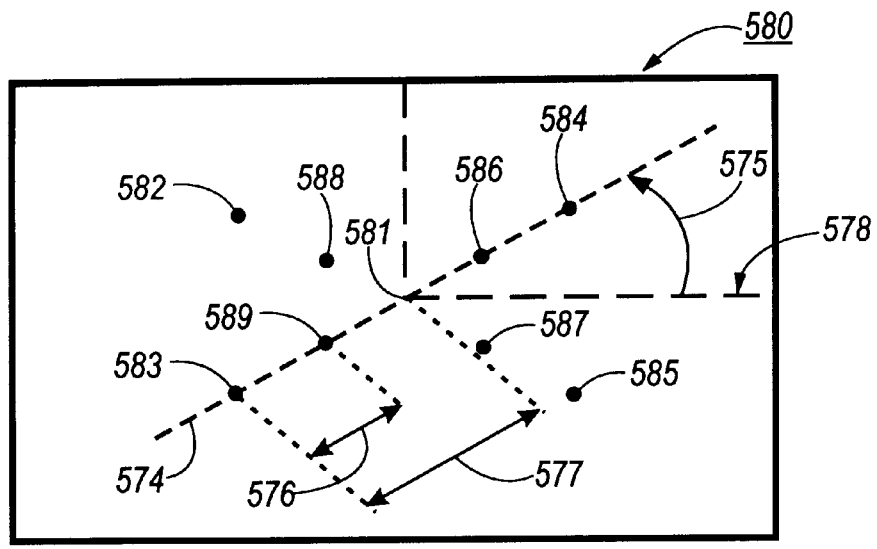
FIG. 15 is an amplitude spatial frequency spectrum image of the yellow-blue band of a modified color image having the signals of FIG. 10 embedded therein, and showing certain geometric relationships between the peak power concentrations that appear in the image.

In another application, the desired result of decoding the sinusoidal image from an acquired image version of a modified image may be to facilitate establishing absolute spatial coordinates in the acquired image. This may be accomplished by adding two or more sinusoids to an original image that have specific characteristics. In particular, the added sinusoids should each have a controlled, predetermined phase, and the phase of the first sinusoid should be different from that of the second sinusoid. The total combined signal formed by the two sinusoids should have a period greater than that of the image extent; so, for example, if the sinusoids have a horizontal spatial direction, the total combined period should be greater than the horizontal dimension (e.g., width) of the image. The relative phases of the sinusoids combined with the fact that the total period of the signal is greater than the image extent allow for designating the location where the two (or more) sinusoids simultaneously cross their horizontal axis to be a unique spatial image origin in the acquired image. FIG. 15 shows sinusoidal image 490 which shows sinusoids 492 and 494. Each of these sinusoids has a phase different from the other and a period greater than the width of the image; they simultaneously cross their common axis at zero only at point 496.

B. Applications for color images with embedded signals.

1. Overview of application processing.

In this discussion of the present invention, the term "acquired image" is used to mean an image that has been digitally captured by a device from a visual rendering of a modified image produced as the output of either operation 200 (FIG. 1) or operation 400 (FIG. 7). Since the modified image is a version of the original image with the periodic signals embedded therein, the modified image acts as a surrogate for the original image, and applications which make use of the signals embedded in the acquired image do so in order to perform operations or computations with respect to the original image. The modified image, and acquired images that are versions of the modified image, in effect carry with them information about the original image without unacceptably altering the aesthetic appearance of the original image.

Typically, an acquired image is produced by a scanning device that optically senses the colors (black and white or chromatic) of a printed rendering of the modified image and converts the captured signals into a digital representation of the image. However, other types of digital capture devices, such as a digital camera, might also be the signal source for the acquired image.

FIG. 13 provides a general flowchart 500 of a class of applications of the present invention in which an image modified according to the technique illustrated in FIGS. 1 or 7 may be used. In order to make clear the distinction between acquired image 504 and modified image 501 in this discussion, the image acquisition process is schematically represented in FIG. 13 as operation 502; the dotted lines surrounding image acquisition operation 502 indicate that it is a process distinct and separate from the class of applications illustrated in flowchart 500.

The class of applications illustrated in flowchart 500 uses signals imperceptibly embedded in an acquired image to determine geometric differences between the acquired image and the original image, without using the actual original image during the decoding process. The signal embedded in the modified image is a periodic signal; information decoded from the acquired image about the spatial frequencies of the embedded periodic signal components along with predetermined geometric information about the embedded signals are used to determine a geometric relationship between the embedded signals in the acquired image and the original embedded signal image. This geometric relationship between the signals may, in turn, be used to compute and automatically match the geometric properties of the acquired image to those of the original image without requiring the input of either the modified or the original image. Such geometric properties include orientation, scale, and linear deformations. Additionally, the phases of the embedded signals in the acquired image can be used to establish absolute local coordinates in the acquired image from which to determine image positions.

Flowchart 500 illustrating this class of applications proceeds as follows. An acquired image 504 and geometric constraint information 508 about the embedded signals are input to decoding operation 520, which determines the spatial frequencies of the embedded signals in acquired image 504. The output of the decoding operation includes a linear mapping 558 of locations of local peak power concentrations between acquired image 504 and modified image 290. This linear mapping information is input to operation 560 which computes certain geometric relationships between acquired image 504 and modified color image 290. Once these geometric relationships are known, acquired image 504 may be geometrically transformed, in box 566 to match the geometric properties of modified color image 290, producing geometrically modified acquired image 570.

2. Decoding an acquired image to locate the added signal component.

Figure 14:
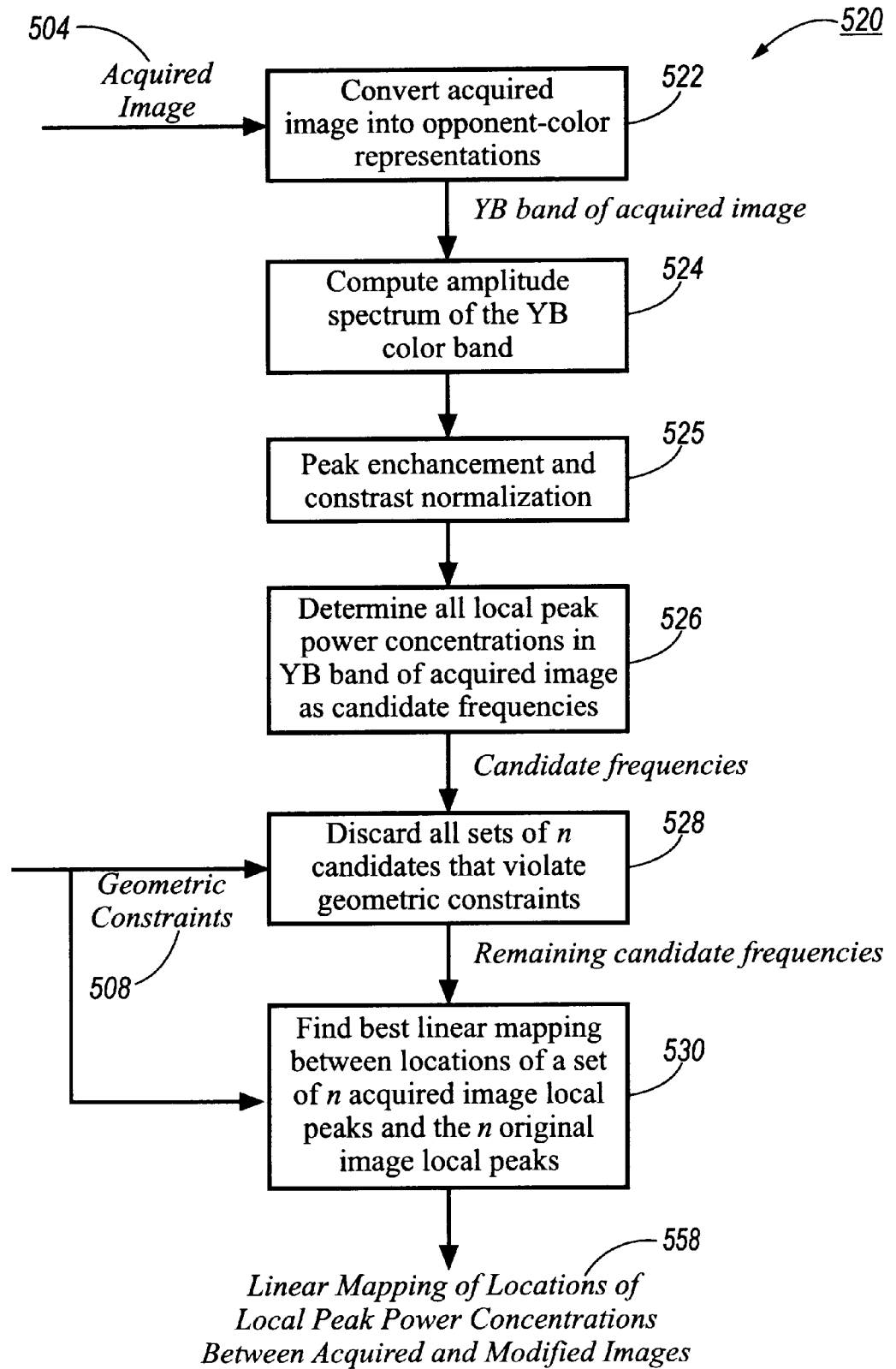
FIG. 14 is a flowchart of a decoding operation for locating the embedded signal in an acquired image according to an illustrated embodiment of the present invention.

FIG. 14 provides a general flowchart of an illustrated embodiment of decoding operation 520 of the present invention. The goal of decoding operation 520 is to locate and identify the spatial frequencies of the sinusoidal signals embedded in an acquired image in the manner described above with respect to the illustrated embodiment of the signal embedding technique shown in FIGS. 7 and 10. Image 480 of FIG. 10 including the set of four (4) sinusoids has a distinctive pattern of local peak power concentrations indicating the locations of the spatial frequencies of the sinusoids; this pattern can be seen in FIG. 15. FIG. 15 shows image 580 of an enhanced log amplitude spatial frequency spectrum of the signal component image of FIG. 10. Image 580 has an image power spectrum origin at point 581 and has been thresholded to show the local peak power concentrations (hereafter simply referred to as peaks) represented at points 582, 583, 584, 585, 586, 587, 588 and 589. It can be seen that these peaks occur in two sets of four each and have geometric relationships to each other with respect to coordinate axis 578 having an origin at position 581. Specifically, the peaks occur at distances 576 and 577 from position 581 (as measured along dashed line 574) and at an angle 575 above and below coordinate axis 578. It was previously noted in the discussion of FIG. 10 that the sinusoids have orientations of ±45° and wavelengths of 3.8 and 2.7 pixels. Image 580 shows the peaks corresponding to these specific characteristics of this signal. In more general terms, an image composed of a set of n sinusoids has the geometric properties of angular orientation differences and radial frequency ratios from a point assigned as an origin of the power spectrum image. These geometric properties of the embedded signal are referred to herein as "geometric constraints", and are the only apriori information that is needed to decode the spatial frequencies from an acquired image in decoding operation 520. The source of the geometric constraint data is unimportant; it may be made available as separate input data from another signal source; or it may be included in the acquired image in some manner.

Returning to FIG. 14, acquired image data structure 504 is first converted into a plurality of opponent-color representations; this is accomplished in the same manner as the original and interim color images were converted into opponent-color representations, as described earlier in the discussion of illustrated embodiment 400 of FIGS. 7 and 8, in boxes 409 and 454. An FFT operation 524 is applied to the YB color separation to compute the amplitude spatial frequency spectrum of the YB band; this spectrum is then divided by a blurred version of itself, in box 525, to enhance the local peak power concentrations. Then, all power peak concentrations in the YB band of the acquired image are located, in box 526, and included as candidate spatial frequencies to be tested.

Figure 16:
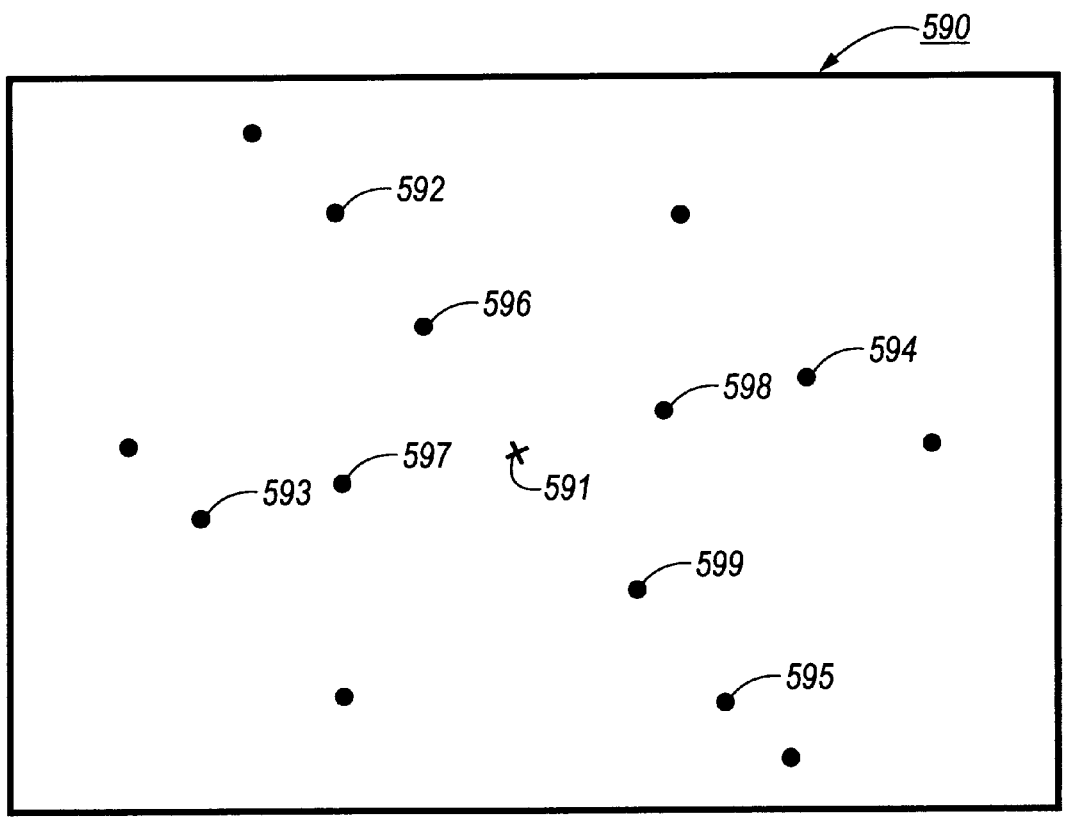
FIG. 16 is an amplitude spatial frequency spectrum image of the yellow-blue band of an acquired image having the signals of FIG. 10 embedded therein.

FIG. 16 shows image 590 of an enhanced log amplitude spatial frequency spectrum of the YB band of acquired image 504 having the sinusoid image 480 of FIG. 10 embedded therein. Image 590 has an image origin at point 591 and been thresholded to show all local peaks. With reference again to FIG. 14, sets of 4 local peaks are compared against the geometric constraints 508 that are shown in FIG. 15, specifically the distance ratio of distances 576 and 577 and angle 575. Those sets of four frequencies that violate constraints 508 are discarded, in box 528. Of the remaining candidate frequencies, the best linear mapping is found, in box 530, between the locations of the local peak power concentrations in the acquired image and the locations of the local peak power concentrations in the sinusoidal image, using the geometric constraints 508. A least squares technique may be used to produce the best mapping. Box 530 produces linear mapping 558 as its output, and decoding operation 520 is complete.

3. Automatic image alignment and scaling.

Figure 17:
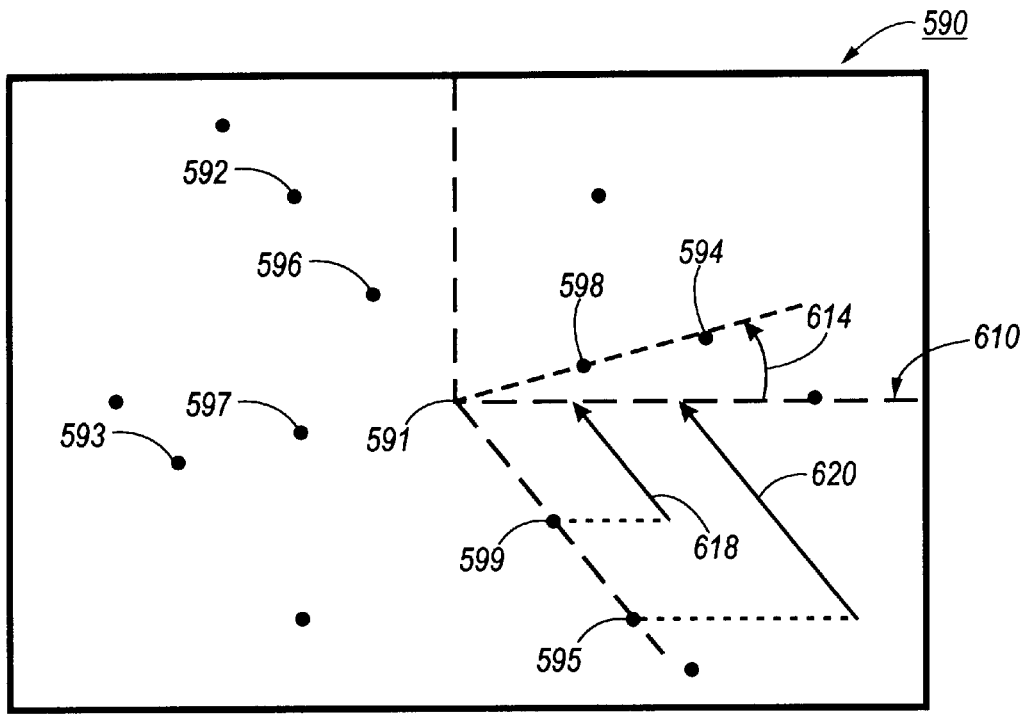
FIG. 17 shows geometric relationships between the peak power concentrations that appear in the amplitude spatial frequency spectrum image of FIG. 16.
Figure 18:
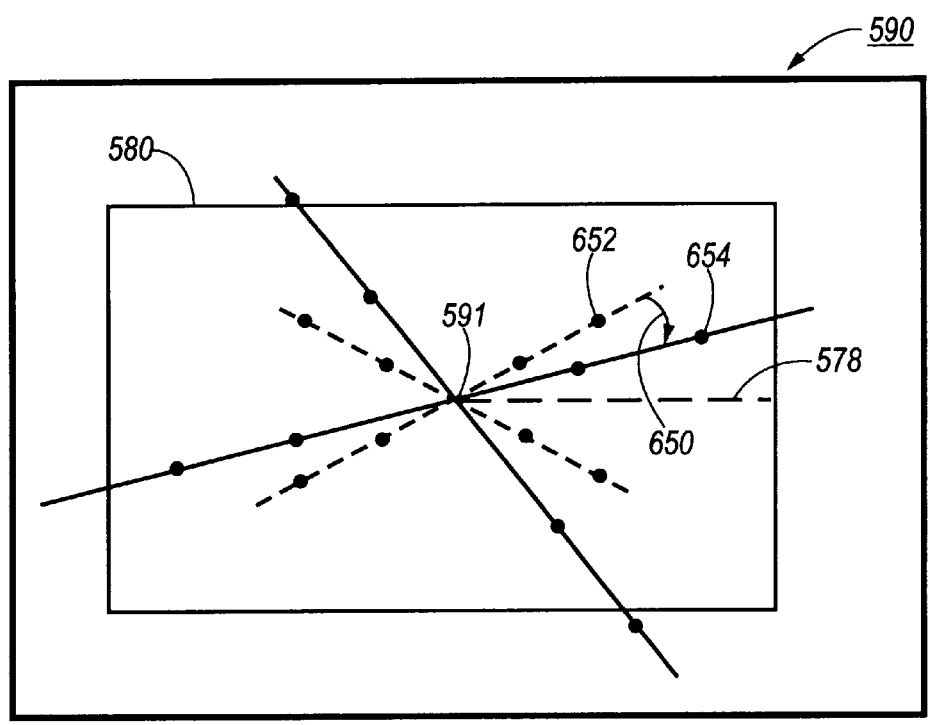
FIG. 18 shows the peak power concentrations that appear in the amplitude spatial frequency spectrum image of FIG. 15 superimposed over the peak power concentrations that appear in the amplitude spatial frequency spectrum image of FIGS. 16 and 17.

As noted in the discussion accompanying FIG. 13, in this class of applications for an image having embedded signals, the linear mapping information is input to an operation that computes geometric relationships between an acquired image and an original image. With respect to the illustrated embodiment of the amplitude spatial frequency spectrum of the acquired image shown in FIG. 16, processing in box 530 (FIG. 14) shows that the best match of a set of 4 spatial frequencies from the remaining candidate frequencies are found at points 592, 593, 594, 595, 596, 597, 598 and 599. As shown in FIG. 17, once these peaks are identified, the angle 614 of orientation from an image coordinate axis 610 and the distances 618 and 620 of the peaks away from point 591 can be computed. It can be seen from a visual comparison between FIGS. 15 and 17 of the position and orientation of these peaks that the peaks in the acquired image as represented in FIG. 17 have geometric properties that differ from those of the peaks in the sinusoidal image as represented in FIG. 15. FIG. 18 illustrates these geometric differences. In FIG. 18, amplitude spatial frequency spectrum image 580 of the sinusoidal image is superimposed on amplitude spatial frequency spectrum 590 of the acquired image and aligned at their designated origin points. The local peaks in image 580 are shown with dashed lines connecting them, while the local peaks in image 590 are shown with solid lines connecting them. It can be seen that the peaks are not aligned; the peak power concentrations in the amplitude spatial frequency spectrum 590 of the acquired image are offset by angle 650, and there are differences in distances of the peaks from the origin by distances 652 and 654. Angle 650 difference represents a rotation of acquired image 504, which may have resulted from misplacement of the visual rendering of the modified image during the image acquisition process. Distance differences 652 and 654 represent a scaling (enlargement) of acquired image 504, which may have occurred, for example, during the rendering of the modified color image. Linear mapping 558, produced as the output of decoding operation 520, is used to compute these geometric differences. Once these geometric properties are computed, acquired image 504 may be automatically reduced in scale and rotated to match the geometric properties of the original image. The class of applications illustrated in the flowchart of FIG. 13 include all such linear geometric transformations between an acquired image and an original image having embedded periodic signals.

4. Other applications for color images having embedded signals.

Figure 11:
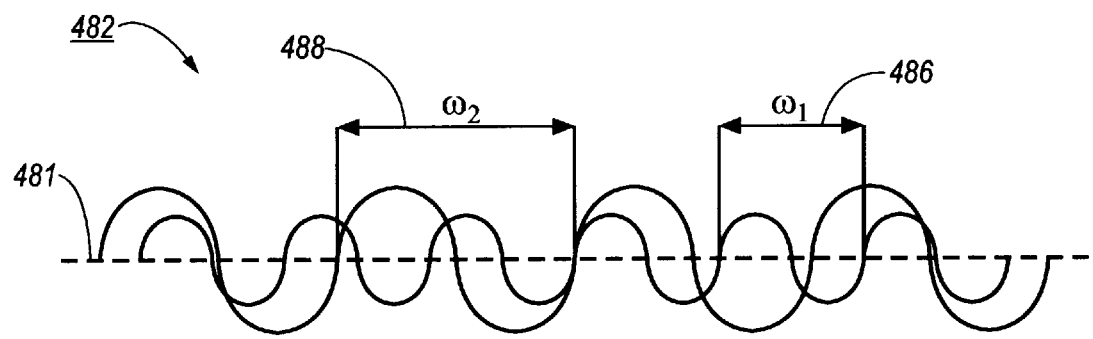
FIG. 11 schematically illustrates a cross section of the image of FIG. 10 showing a pair of the sinusoids in that image.
Figure 12:
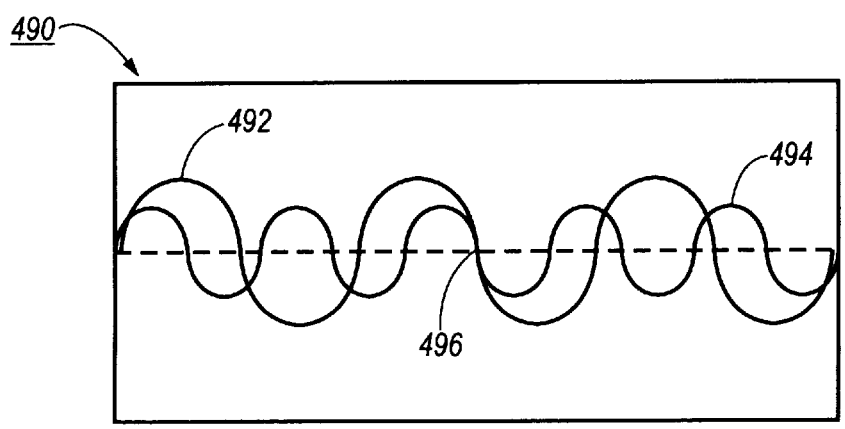
FIG. 12 schematically illustrates a second image of a set of sinusoidal signals that are also suitable for embedding in a color image.

As discussed in the background section, much research and development is concerned with imperceptibly embedding information in images. The embedding technique of the illustrated embodiment may be used in conjunction with any other suitable information embedding technique. As noted earlier, the sinusoids of FIG. 10 when embedded in an acquired image produce a grid across the image. The decoding operation locates and identifies the spatial frequencies; this information along with the geometric constraint information of the original image enables the acquired image to be geometrically matched to the original image. Decoding of the phase of the embedded sinusoids enables an absolute coordinate frame to be assigned to the acquired image, provided that the sinusoids are embedded as described in the discussion accompanying FIG. 11. Knowledge of the location of the sinusoidal grid in the acquired image permits the grid to function as a landmark for other information that may be imperceptibly embedded in the acquired image. The ability to orient and locate other embedded information is another important application of the embedding technique described herein.

Another feature of the present invention is that the technique for decoding the sinusoidal grid can be straightforwardly extended to determine whether there are locally smooth nonlinear deformations of the modified image, such as those that occur when the image has not been placed flat on the platen of a scanner. Detection of these deformations produces local geometric inhomogeneities of the sinusoidal grid; the ability to map the modified image to the original image allows automatic correction of the deformed portion (s) of the image.

D. The Machine and Software Product of the Invention.

FIG. 19 is a block diagram of a generalized, processor-controlled machine 100; the present invention may be used in any machine having the common components, characteristics, and configuration of machine 100, and is not inherently related to any particular processor, machine, system or other apparatus. The machine or system may be specially constructed and optimized for the purpose of carrying out the invention, or it may comprise a general purpose computer selectively activated or reconfigured by a computer program stored in the computer, or it may be a combination of a general purpose computer and auxiliary special purpose hardware. When a machine such as machine 100 is suitably programmed to embody the present invention, the machine is not a standard or known configuration.

Machine 100 may be configured to perform any one of operation 200 of FIG. 1 to embed data in a color image, operation 520 of FIG. 14 to decode an embedded signal from an acquired image, or operation 500 of FIG. 13 to compute the geometric relationship between an acquired and a modified color image, or it may be configured to perform all of these operations. An input color image, such as original color image color image 300 of FIG. 2, color image 404 of FIG. 7, or acquired image 504 of FIG. 13, is provided from signal source 158. Signal source 158 may be a memory device, a communications channel, a data bus, another processor performing an operation, or any other suitable source of color image signals. For example, signal source 158 may be an image capture device, such as a scanning device, a digital camera, or an interface device that produces a digital image definition data structure from another type of image signal. An input color image provided by signal source 158 is forwarded via input circuitry 156 to processor 140 and may be stored in data memory 114. Machine 100 may, but need not, include a conventional display device (not shown) capable of presenting images, such as a cathode ray tube, a liquid crystal display (LCD) device, a printing device, or any other device suitable for presenting images.

Processor 140 operates by accessing program memory 110 to retrieve instructions, which it then executes. When machine 100 is configured to perform signal embedding operation 200, program memory 110 includes signal embedding instructions 200 that implement the functions shown in flowchart 200 of FIG. 1. Program memory 110 includes instructions for the subroutines needed to produce the modified color image having the embedded signals according to signal embedding instructions 200; these include perceptual difference measurement instructions 240 and attenuation image production instructions 280. Similarly, when machine 100 is configured to perform embedded signal decoding operation 520, program memory 110 includes decoding instructions 520 that implement the functions shown in the flowchart of FIG. 14, and also includes instructions for the subroutines needed to decode the spatial frequencies from an acquired image. When machine 100 is configured to perform automatic image scaling and alignment, or another type of application, on an acquired image, program memory 110 includes application instructions 500 that implement the functions shown in the flowchart of FIG. 13, including instructions for the subroutines shown in FIG. 13 for transforming the geometric properties of the acquired image to match those of the original image.

During execution of the instructions, processor 140 may access data memory 114 to obtain or store data necessary for performing its operations. For example, when machine 100 is configured to perform operation 200 for embedding a signal in an original color image, data memory 114 stores the image data structure 404 defining the original color image as well as the image data structures defining the opponent-colors representations 412 of the original and interim versions of the modified color images, and the final modified color image 424 with the embedded signals. Data memory 114 also stores signal component data 408 to be added to original color image 404, and data 416 defining perceptual difference measurements $\Delta E(x,y)$. Data memory 114 also stores various other miscellaneous data. Similarly, when machine 100 is configured to perform decoding operation 520, data memory 114 stores geometric constraints 508, candidate spatial frequencies, and linear mapping 558 of locations of local peak power concentrations between acquired and modified image spatial frequency power spectra.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.)

FIG. 19 also shows software product 160, an article of manufacture that can be used in a machine that includes components like those shown in machine 100. Software product 160 includes data storage medium 170 that can be accessed by storage medium access circuitry 150. Data storage medium 170 stores instructions for executing one or more of operation 200 of FIG. 1, operation 500 of FIG. 13, or operation 520 of FIG. 14, and may also include instructions for performing these operations according to the illustrated embodiments illustrated in FIGS. 7, 8 and 9.

Software product 160 may be commercially available to a consumer in the form of a shrink-wrap package that includes data storage medium 170 and appropriate documentation describing the product. In that case, a data storage medium is a physical medium that stores instruction data. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. "Storage medium access circuitry" is circuitry that can access data on a data storage medium. Storage medium access circuitry 150 may be contained in a distinct physical device into which data storage medium 170 is inserted in order for the storage medium access circuitry to access the data stored thereon. Examples of storage medium access devices include disk drives and CD-ROM readers. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data on data storage medium 170 when data storage medium 170 is stored as part of a remotely-located storage device, such as a server. Software product 160 may be commercially or otherwise available to a user in the form of a data stream indicating instruction data for performing the method of the present invention that is transmitted to the user over a communications facility from the remotely-located storage device. In the latter case, article 160 is embodied in physical form as signals stored on the remotely-located storage device; the user purchases or accesses a copy of the contents of data storage medium 170 containing instructions for performing the present invention, but typically does not purchase or acquire any rights in the actual remotely-located storage device. When software product 160 is provided in the form of a data stream transmitted to the user over a communications facility from the remotely-located storage device, instruction data stored on data storage medium 170 is accessible using storage medium access circuitry 150. Alternatively, a data stream transmitted to the user over a communications facility from the remotely-located storage device may be stored in some suitable local memory device of machine 100, which might be program memory 110, or a data storage medium locally accessible to machine 100 (not shown), which would then also be accessible using storage medium access circuitry 150.

FIG. 19 shows data storage medium 170 configured for storing instruction data for performing operations 200 (FIG. 1), 500 (FIG. 13) and 520 (FIG. 14). This instruction data is provided to processor 140 for execution when the technique for embedding imperceptible signal data in a color image is to be used. The stored data includes binary data signal embedding instructions 162 and 164; when these instructions are provided to processor 140, and processor 140 executes them, the machine is operated to perform the operations for adding imperceptible signal data to an original color image, as represented in the flowchart of FIG. 1. For example, as shown in FIG. 19, the stored data include perceptual difference measurement instructions 164; when these instructions are provided to processor 140, and processor 140 executes them, the machine is operated to perform the operations for measuring perceptual differences between the original color image and the current version of the modified color image using a human perception model, as represented in box 240 of FIG. 1, or in the flowchart of FIG. 8. The stored data shown also include attenuation image production instructions 162; when these instructions are provided to processor 140, and processor 140 executes them, the machine is operated to perform the operations for producing an attenuated signal component for the next iteration of the signal embedding operation, as represented in box 280 of FIG. 1, or in the flowchart of FIG. 9.

Also shown in FIG. 19, the data stored on data storage medium 170 further includes instruction data 166 indicating decoding instructions for decoding the signal component embedded in a modified color image; when these instructions are provided to processor 140, and processor 140 executes them, the machine is operated to perform decoding operation 520, as represented in the flowchart of FIG. 14. The data stored on data storage medium 170 further includes instruction data 168 indicating geometric transformation instructions for automatically transforming the geometric attributes, such as skew and scale, of an acquired image to match those of its corresponding original color image; when these instructions are provided to processor 140, and processor 140 executes them, the machine is operated to perform automatic spatial distortion correction, deskewing and scaling of an acquired image, as one of the class of applications represented in operation 500 of FIG. 13.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

What is claimed is:

1. A method for operating a machine to automatically transform geometric properties of an acquired image version of an original image to match geometric properties of the original image; the machine including a signal source connected for receiving signals, a processor and a memory device for storing data; the data stored in the memory device including instruction data the processor executes to operate the machine; the processor being connected to the memory device for accessing and executing the instruction data stored therein; the method comprising:

operating the processor to obtain from the signal source an acquired image data structure defining an acquired image; the acquired image being a version of an original image and additionally having embedded signals therein not included in the original image; the embedded signals having predetermined geometric relationships with respect to each other;

operating the processor to obtain geometric constraint data indicating expected geometric relationships about the embedded signals in the acquired image;

operating the processor to determine the predetermined geometric relationships of the embedded signals in the acquired image;

operating the processor to compute geometric differences between the acquired image and the original image using the predetermined geometric relationships of the embedded signals in the acquired image and using the geometric constraint data indicating the expected geometric relationships of the embedded signals;

operating the processor to transform geometric properties of an acquired image version of an original image to match geometric properties of the original image using the geometric differences computed between the acquired and original images.

2. The method of claim 1 for operating a machine to automatically transform geometric properties of an acquired image version of an original image to match geometric properties of the original image further including, prior to locating the signal in the acquired image data structure, operating the processor to convert the acquired image into a plurality of individual color representations; and wherein determining the geometric relationships of the embedded signals in the acquired image includes using a selected one of the individual color representations.

3. The method of claim 2 wherein the plurality of individual color representations include a black-white image, a red-green-image and a yellow-blue image; and wherein the selected one of the individual color representations is any one of the black-white, the red-green or the yellow-blue images.

4. The method of claim 1 for operating a machine to automatically transform geometric properties of an acquired image version of an original image to match geometric properties of the original image wherein the embedded signals in the acquired image are embedded periodic signals.

5. The method of claim 4 wherein the embedded periodic signals include at least two embedded sinusoidal signals.

6. The method of claim 5 wherein the at least two embedded sinusoidal signals have different angular orientations and form a grid in the acquired image.

7. The method of claim 4 wherein determining the geometric relationships of the embedded signals in the acquired image using the geometric constraint data includes operating the processor to produce an amplitude spatial frequency spectrum image of the acquired image;

operating the processor to determine locations in the amplitude spatial frequency spectrum image of local peak power concentrations representing the embedded periodic signals in the acquired image; and operating the processor to compute the geometric relationships among the embedded periodic signals using the geometric constraint data and the locations of the local peak power concentrations.

8. The method of claim 7 wherein the geometric relationships among the embedded periodic signals include angular orientation differences and radial frequency ratios among the local peak power concentrations as measured from a point assigned as an origin of the amplitude spatial frequency spectrum image.

9. The method of claim 1 for operating a machine to automatically transform geometric properties of an acquired image version of an original image to match geometric properties of the original image wherein the geometric differences computed between the acquired image and the original image include an image size difference; the acquired image being scaled to a different size than the original image; and wherein transforming the geometric properties of the acquired image includes scaling the size of the acquired image to match the size of the original image.

10. The method of claim 1 for operating a machine to automatically transform geometric properties of an acquired image version of an original image to match geometric properties of the original image wherein the geometric differences computed between the acquired image and the original image include an image orientation difference; the acquired image having a different spatial orientation than the original image; and wherein transforming the geometric properties of the acquired image includes rotating the acquired image to match the spatial orientation of the original image.

11. The method of claim 1 for operating a machine to automatically transform geometric properties of an acquired image version of an original image to match geometric properties of the original image wherein the geometric constraint data is obtained from data included in the acquired image.

12. The method of claim 1 for operating a machine to automatically transform geometric properties of an acquired image version of an original image to match geometric properties of the original image wherein the geometric constraint data is obtained from a signal source.

13. A method for operating a processor-controlled machine to decode periodic signals embedded in an image; the machine including a processor and a memory device for storing data; the data stored in the memory device including instruction data the processor executes to operate the machine; the processor being connected to the memory device for accessing and executing the instruction data stored therein; the method comprising:

operating the processor to obtain an image data structure defining an image; the image including a set of n periodic signals embedded therein; the set of n periodic signals having geometric relationships with respect to each other;

operating the processor to obtain geometric constraint data indicating expected geometric relationships about the set of n periodic signals embedded in the image;

operating the processor to identify a plurality of local peak power concentrations in a two-dimensional spatial frequency power spectrum of the image;

operating the processor to eliminate a subset of the local peak power concentrations that do not satisfy the geometric constraint data indicating expected geometric relationships about the set of n periodic signals embedded in the image; a remaining subset of the local peak power concentrations being determined to be candidate local peak power concentrations indicating spatial frequencies and directions of the set of n periodic signals; and operating the processor to compute a best linear mapping between sets of n candidate local peak power concentrations in the image and a set of n periodic signals indicated by the geometric constraint data; the best linear mapping identifying the spatial frequencies and directions of the set of n periodic signals embedded in the image.

14. The method of claim 13 for operating a machine to decode periodic signals embedded in an image wherein the set of n periodic signals embedded in the image is a set of n sinusoidal signals.

15. The method of claim 13 wherein the set of n sinusoidal signals include at least two sinusoidal signals having different angular orientations in the modified image and forming a grid.

16. The method of claim 13 for operating a machine to decode periodic signals embedded in an image wherein the image is a color image; wherein the set of n periodic signals embedded in the color image are embedded in at least one of a plurality of opponent-color image representations of the color image; and wherein identifying the plurality of local peak power concentrations in the image includes converting the color image into the plurality of opponent-color image representations and identifying the plurality of local peak power concentrations in the at least one of the plurality of opponent-color image representations.

17. The method of claim 16 wherein the opponent color image representations include a yellow-blue color band; and wherein identifying the plurality of local peak power concentrations in the image includes identifying the plurality of local peak power concentrations in the yellow-blue color band.

18. An article of manufacture for use in a machine that includes a memory device for storing data; a storage medium access device for accessing a medium that stores data; and a processor connected for accessing the data stored in the memory device and for receiving data from the storage medium access device; the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, obtaining from a signal source an acquired image data structure defining an acquired image; the acquired image being a version of an original image and additionally having embedded signals therein not included in the original image; the embedded signals having geometric relationships with respect to each other;

the processor, further in executing the instructions, obtaining geometric constraint data indicating expected geometric relationships about the embedded signals in the acquired image;

the processor, further in executing the instructions, determining the geometric relationships of the embedded signals in the acquired image;

the processor, further in executing the instructions, computing geometric differences between the acquired image and the original image using the geometric relationships of the embedded signals in the acquired image and using the geometric constraint data indicating the expected geometric relationships of the embedded signals in the original image;

the processor, still further in executing the instructions, transforming geometric properties of an acquired image version of an original image to match geometric properties of the original image using the geometric differences computed between the acquired and original images.

\* \* \* \* \*